(12) United States Patent
Bredsguard et al.

(10) Patent No.: US 9,487,725 B2
(45) Date of Patent: Nov. 8, 2016

(54) COMPOSITIONS COMPRISING ESTOLIDE COMPOUNDS AND METHODS OF MAKING AND USING THE SAME

(71) Applicant: BIOSYNTHETIC TECHNOLOGIES, LLC, Irvine, CA (US)

(72) Inventors: Jakob Bredsguard, Lake Forest, CA (US); Travis Thompson, Anaheim, CA (US); Jeremy Forest, Honolulu, HI (US)

(73) Assignee: Biosynthetic Technologies, LLC., Irvine, CA (US)

( * ) Notice: Subject to any disclaimer, the term of this patent is extended or adjusted under 35 U.S.C. 154(b) by 0 days.

(21) Appl. No.: 14/676,516

(22) Filed: Apr. 1, 2015

(65) Prior Publication Data
US 2015/0259620 A1  Sep. 17, 2015

Related U.S. Application Data

(63) Continuation of application No. 14/100,469, filed on Dec. 9, 2013, now Pat. No. 9,016,097, which is a continuation of application No. 13/754,775, filed on Jan. 30, 2013, now Pat. No. 8,633,143, which is a continuation of application No. 13/587,120, filed on Aug. 16, 2012, now Pat. No. 8,399,389, which is a continuation of application No. 13/531,923, filed on Jun. 25, 2012, now Pat. No. 8,287,754, which is a continuation of application No. 13/404,903, filed on Feb. 24, 2012, now Pat. No. 8,236,194.

(60) Provisional application No. 61/498,499, filed on Jun. 17, 2011, provisional application No. 61/569,046, filed on Dec. 9, 2011.

(51) Int. Cl.
| | |
|---|---|
| C10M 169/04 | (2006.01) |
| G05D 16/00 | (2006.01) |
| C10M 111/04 | (2006.01) |
| C09K 5/04 | (2006.01) |
| C10M 105/42 | (2006.01) |
| C10M 171/00 | (2006.01) |
| C09K 5/00 | (2006.01) |
| C10M 129/72 | (2006.01) |
| B21J 3/00 | (2006.01) |

(52) U.S. Cl.
CPC .............. *C10M 111/04* (2013.01); *B21J 3/00* (2013.01); *C09K 5/00* (2013.01); *C09K 5/044* (2013.01); *C09K 5/045* (2013.01); *C10M 105/42* (2013.01); *C10M 129/72* (2013.01); *C10M 169/042* (2013.01); *C10M 171/008* (2013.01); *C09K 2205/12* (2013.01); *C10M 2207/02* (2013.01); *C10M 2207/042* (2013.01); *C10M 2207/10* (2013.01); *C10M 2207/28* (2013.01); *C10M 2207/301* (2013.01); *C10M 2223/04* (2013.01); *C10M 2223/043* (2013.01); *C10N 2220/022* (2013.01); *C10N 2220/30* (2013.01); *C10N 2220/301* (2013.01); *C10N 2220/302* (2013.01); *C10N 2220/303* (2013.01); *C10N 2220/305* (2013.01); *C10N 2220/306* (2013.01)

(58) Field of Classification Search
CPC .......... C10M 169/042; C10M 169/04; G05D 16/00
USPC ........................ 508/506, 496; 137/1, 2, 3, 12
See application file for complete search history.

(56) References Cited

U.S. PATENT DOCUMENTS

| | | | |
|---|---|---|---|
| 2,049,072 A | 7/1936 | Mikeska et al. | |
| 2,652,411 A | 9/1953 | Teeter et al. | |

(Continued)

FOREIGN PATENT DOCUMENTS

| | | |
|---|---|---|
| WO | 9925794 | 5/1999 |
| WO | 0153247 | 7/2001 |

(Continued)

OTHER PUBLICATIONS

Article 19 Amendments and Letter Accompanying Replacement Sheets for counterpart application PCT/US2012/026538, filed May 17, 2012.

(Continued)

*Primary Examiner* — Douglas McGinty
(74) *Attorney, Agent, or Firm* — Jeremy Forest

(57) ABSTRACT

Provided herein are compositions comprising at least one estolide compound of formula:

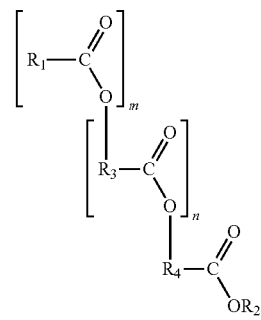

in which n is an integer equal to or greater than 0; m is an integer equal to or greater than 1; $R_1$, independently for each occurrence, is selected from optionally substituted alkyl that is saturated or unsaturated, and branched or unbranched; $R_2$ is selected from hydrogen and optionally substituted alkyl that is saturated or unsaturated, and branched or unbranched; and $R_3$ and $R_4$, independently for each occurrence, are selected from optionally substituted alkyl that is saturated or unsaturated, and branched or unbranched. Also provided are uses of the compositions described herein.

20 Claims, No Drawings

(56) References Cited

U.S. PATENT DOCUMENTS

| | | | |
|---|---|---|---|
| 2,862,884 A | | 12/1958 | Dilworth et al. |
| 4,428,850 A | | 1/1984 | Zoleski et al. |
| 5,380,894 A | | 1/1995 | Burg et al. |
| 5,451,332 A | | 9/1995 | Lawate |
| 6,018,063 A | * | 1/2000 | Isbell .................. C10M 101/04 508/460 |
| 6,028,210 A | | 2/2000 | Watts et al. |
| 6,316,649 B1 | * | 11/2001 | Cermak ............... C10M 101/04 508/485 |
| 7,252,779 B2 | | 8/2007 | Mosier et al. |
| 7,666,828 B2 | | 2/2010 | Bernhardt et al. |
| 7,998,920 B2 | | 8/2011 | Murphy et al. |
| 8,236,194 B1 | | 8/2012 | Bredsguard et al. |
| 8,258,326 B1 | | 9/2012 | Forest et al. |
| 8,268,199 B1 | | 9/2012 | Forest et al. |
| 8,273,694 B2 | | 9/2012 | Brown et al. |
| 8,287,754 B1 | | 10/2012 | Thompson et al. |
| 8,372,301 B2 | | 2/2013 | Bredsguard et al. |
| 8,399,389 B2 | | 3/2013 | Bredsguard et al. |
| 8,541,351 B2 | | 9/2013 | Thompson et al. |
| 8,633,143 B2 | | 1/2014 | Thompson et al. |
| 2002/0017629 A1 | | 2/2002 | Mosier et al. |
| 2002/0193262 A1 | | 12/2002 | Kaimai et al. |
| 2004/0046146 A1 | | 3/2004 | Ankner et al. |
| 2004/0192859 A1 | * | 9/2004 | Parker .................. C08G 59/186 525/438 |
| 2007/0092475 A1 | | 4/2007 | Wohlman et al. |
| 2007/0161832 A1 | | 7/2007 | Myllyoja et al. |
| 2008/0020956 A1 | | 1/2008 | Mosier et al. |
| 2009/0159835 A1 | | 6/2009 | Kramer et al. |
| 2009/0159837 A1 | | 6/2009 | Kramer et al. |
| 2009/0247438 A1 | | 10/2009 | Wright et al. |
| 2010/0120643 A1 | * | 5/2010 | Brown .................. C10M 105/38 508/496 |
| 2010/0184855 A1 | | 7/2010 | Bernhardt et al. |
| 2011/0105814 A1 | | 5/2011 | Kolvusalmi et al. |
| 2011/0294174 A1 | | 12/2011 | Franklin et al. |
| 2012/0018667 A1 | | 1/2012 | Krammer et al. |
| 2012/0083435 A1 | | 4/2012 | Bredsguard |
| 2012/0172269 A1 | | 7/2012 | Greaves et al. |
| 2012/0172609 A1 | | 7/2012 | Bredsguard |
| 2012/0178660 A1 | | 7/2012 | Bredsguard |
| 2012/0322707 A1 | | 12/2012 | Bredsguard et al. |

FOREIGN PATENT DOCUMENTS

| | | |
|---|---|---|
| WO | 2011037778 | 3/2011 |
| WO | 2011106186 | 9/2011 |

OTHER PUBLICATIONS

Co-pending U.S. Appl. No. 13/950,508, filed Jul. 25, 2013.
Informal Comments filed in response to International Search Report and Written Opinion for counterpart application PCT/US2012/026538, filed May 17, 2012.
International Search Report and Written Opinion for counterpart application PCT/US2012/026538, mailed Apr. 26, 2012.
Notice of Allowance dated Aug. 20, 2012, for U.S. Appl. No. 13/531,923, filed Jun. 25, 2012.
Notice of Allowance dated Dec. 6, 2013, for U.S. Appl. No. 13/754,775, filed Jan. 30, 2013.
Office Action dated Sep. 3, 2013, for U.S. Appl. No. 13/754,775, filed Jan. 30, 2013.
Cermak, et al., "Physical properties of saturated estolides and their 2-ethylhexyl esters", 16:, 2002, 119-27.
Isbell, et al., "Physical Properties of Estolides and their Ester Derivatives", Indus.Crops and Prods., 2001, 13: 11-20.
Rudnick, L. R., "Synthetics, Mineral Oils, and Bio-Based Lubricants", CRC Press, Boca Raton, FL; Chap. 22, 2006, 371-74.

* cited by examiner

COMPOSITIONS COMPRISING ESTOLIDE COMPOUNDS AND METHODS OF MAKING AND USING THE SAME

CROSS REFERENCE TO RELATED APPLICATIONS

This application claims the benefit under 35 U.S.C. §119 (e) of U.S. Provisional Patent Application No. 61/498,499, filed Jun. 17, 2011, and U.S. Provisional Patent Application No. 61/569,046, filed Dec. 9, 2011, which are incorporated herein by reference in their entireties for all purposes.

FIELD

The present disclosure relates to compositions comprising estolide compounds and methods of making the same, such as hydraulic fluids, 4-stroke lubricants, food-grade lubricants, refrigerating fluids, compressor fluids, metalworking fluids, and plasticized compositions.

BACKGROUND

Lubricant compositions typically comprise a base oil, such as a hydrocarbon base oil, and one or more additives. Exemplary lubricant compositions may include hydraulic fluids, 4-stroke lubricants, food-grade lubricants, refrigerating fluids, compressor fluids, and metalworking fluids. Plastics and plasticized compositions typically comprise a polymeric material and a plasticizer.

SUMMARY

Described herein are compositions comprising at least one estolide compound, and methods of making and using the same.

In certain embodiments, the composition comprises at least one estolide compound of Formula I:

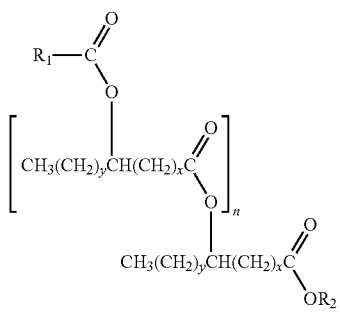

Formula I wherein x is, independently for each occurrence, an integer selected from 0, 1, 2, 3, 4, 5, 6, 7, 8, 9, 10, 11, 12, 13, 14, 15, 16, 17, 18, 19, and 20;

y is, independently for each occurrence, an integer selected from 0, 1, 2, 3, 4, 5, 6, 7, 8, 9, 10, 11, 12, 13, 14, 15, 16, 17, 18, 19, and 20;

n is an integer selected from 0, 1, 2, 3, 4, 5, 6, 7, 8, 9, 10, 11, and 12;

$R_1$ is an optionally substituted alkyl that is saturated or unsaturated, and branched or unbranched; and $R_2$ is selected from hydrogen and optionally substituted alkyl that is saturated or unsaturated, and branched or unbranched;

wherein each fatty acid chain residue of said at least one compound is independently optionally substituted.

In certain embodiments, the composition comprises at least one estolide compound of Formula II:

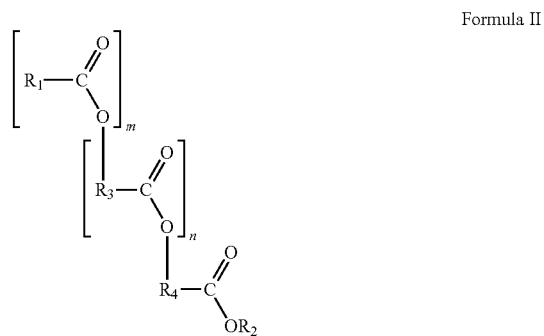

Formula II wherein m is an integer equal to or greater than 1;

n is an integer equal to or greater than 0;

$R_1$, independently for each occurrence, is an optionally substituted alkyl that is saturated or unsaturated, and branched or unbranched;

$R_2$ is selected from hydrogen and optionally substituted alkyl that is saturated or unsaturated, and branched or unbranched; and $R_3$ and $R_4$, independently for each occurrence, are selected from optionally substituted alkyl that is saturated or unsaturated, and branched or unbranched.

In certain embodiments, the composition comprises at least one estolide compound of Formula III:

Formula III wherein x is, independently for each occurrence, an integer selected from 0, 1, 2, 3, 4, 5, 6, 7, 8, 9, 10, 11, 12, 13, 14, 15, 16, 17, 18, 19, and 20;

y is, independently for each occurrence, an integer selected from 0, 1, 2, 3, 4, 5, 6, 7, 8, 9, 10, 11, 12, 13, 14, 15, 16, 17, 18, 19, and 20;

n is an integer equal to or greater than 0;

$R_1$ is an optionally substituted alkyl that is saturated or unsaturated, and branched or unbranched; and $R_2$ is selected from hydrogen and optionally substituted alkyl that is saturated or unsaturated, and branched or unbranched;

wherein each fatty acid chain residue of said at least one compound is independently optionally substituted.

DETAILED DESCRIPTION

The use of lubricants and lubricant-containing compositions may result in the dispersion of such fluids, compounds, and/or compositions in the environment. Petroleum base oils used in common lubricant compositions, as well as additives, are typically non-biodegradable and can be toxic. The present disclosure provides for the preparation and use of compositions comprising partially or fully bio-degradable base oils, including base oils comprising one or more estolides.

In certain embodiments, the compositions comprising one or more estolides are partially or fully biodegradable and thereby pose diminished risk to the environment. In certain embodiments, the compositions meet guidelines set for by the Organization for Economic Cooperation and Development (OECD) for degradation and accumulation testing. The OECD has indicated that several tests may be used to determine the "ready biodegradability" of organic chemicals. Aerobic ready biodegradability by OECD 301D measures the mineralization of the test sample to $CO_2$ in closed aerobic microcosms that simulate an aerobic aquatic environment, with microorganisms seeded from a waste-water treatment plant. OECD 301D is considered representative of most aerobic environments that are likely to receive waste materials. Aerobic "ultimate biodegradability" can be determined by OECD 302D. Under OECD 302D, microorganisms are pre-acclimated to biodegradation of the test material during a pre-incubation period, then incubated in sealed vessels with relatively high concentrations of microorganisms and enriched mineral salts medium. OECD 302D ultimately determines whether the test materials are completely biodegradable, albeit under less stringent conditions than "ready biodegradability" assays.

As used in the present specification, the following words, phrases and symbols are generally intended to have the meanings as set forth below, except to the extent that the context in which they are used indicates otherwise. The following abbreviations and terms have the indicated meanings throughout:

A dash ("-") that is not between two letters or symbols is used to indicate a point of attachment for a substituent. For example, —C(O)NH$_2$ is attached through the carbon atom.

"Alkoxy" by itself or as part of another substituent refers to a radical —OR$^{31}$ where R$^{31}$ is alkyl, cycloalkyl, cycloalkylalkyl, aryl, or arylalkyl, which can be substituted, as defined herein. In some embodiments, alkoxy groups have from 1 to 8 carbon atoms. In some embodiments, alkoxy groups have 1, 2, 3, 4, 5, 6, 7, or 8 carbon atoms. Examples of alkoxy groups include, but are not limited to, methoxy, ethoxy, propoxy, butoxy, cyclohexyloxy, and the like.

"Alkyl" by itself or as part of another substituent refers to a saturated or unsaturated, branched, or straight-chain monovalent hydrocarbon radical derived by the removal of one hydrogen atom from a single carbon atom of a parent alkane, alkene, or alkyne. Examples of alkyl groups include, but are not limited to, methyl; ethyls such as ethanyl, ethenyl, and ethynyl; propyls such as propan-1-yl, propan-2-yl, prop-1-en-1-yl, prop-1-en-2-yl, prop-2-en-1-yl (allyl), prop-1-yn-1-yl, prop-2-yn-1-yl, etc.; butyls such as butan-1-yl, butan-2-yl, 2-methyl-propan-1-yl, 2-methyl-propan-2-yl, but-1-en-1-yl, but-1-en-2-yl, 2-methyl-prop-1-en-1-yl, but-2-en-1-yl, but-2-en-2-yl, buta-1,3-dien-1-yl, buta-1,3-dien-2-yl, but-1-yn-1-yl, but-1-yn-3-yl, but-3-yn-1-yl, etc.; and the like.

Unless otherwise indicated, the term "alkyl" is specifically intended to include groups having any degree or level of saturation, i.e., groups having exclusively single carbon-carbon bonds, groups having one or more double carbon-carbon bonds, groups having one or more triple carbon-carbon bonds, and groups having mixtures of single, double, and triple carbon-carbon bonds. Where a specific level of saturation is intended, the terms "alkanyl," "alkenyl," and "alkynyl" are used. In certain embodiments, an alkyl group comprises from 1 to 40 carbon atoms, in certain embodiments, from 1 to 22 or 1 to 18 carbon atoms, in certain embodiments, from 1 to 16 or 1 to 8 carbon atoms, and in certain embodiments from 1 to 6 or 1 to 3 carbon atoms. In certain embodiments, an alkyl group comprises from 8 to 22 carbon atoms, in certain embodiments, from 8 to 18 or 8 to 16. In some embodiments, the alkyl group comprises from 3 to 20 or 7 to 17 carbons. In some embodiments, the alkyl group comprises 1, 2, 3, 4, 5, 6, 7, 8, 9, 10, 11, 12, 13, 14, 15, 16, 17, 18, 19, 20, 21, or 22 carbon atoms.

"Aryl" by itself or as part of another substituent refers to a monovalent aromatic hydrocarbon radical derived by the removal of one hydrogen atom from a single carbon atom of a parent aromatic ring system. Aryl encompasses 5- and 6-membered carbocyclic aromatic rings, for example, benzene; bicyclic ring systems wherein at least one ring is carbocyclic and aromatic, for example, naphthalene, indane, and tetralin; and tricyclic ring systems wherein at least one ring is carbocyclic and aromatic, for example, fluorene. Aryl encompasses multiple ring systems having at least one carbocyclic aromatic ring fused to at least one carbocyclic aromatic ring, cycloalkyl ring, or heterocycloalkyl ring. For example, aryl includes 5- and 6-membered carbocyclic aromatic rings fused to a 5- to 7-membered non-aromatic heterocycloalkyl ring containing one or more heteroatoms chosen from N, O, and S. For such fused, bicyclic ring systems wherein only one of the rings is a carbocyclic aromatic ring, the point of attachment may be at the carbocyclic aromatic ring or the heterocycloalkyl ring. Examples of aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. In certain embodiments, an aryl group can comprise from 5 to 20 carbon atoms, and in certain embodiments, from 5 to 12 carbon atoms. In certain embodiments, an aryl group can comprise 5, 6, 7, 8, 9, 10, 11, 12, 13, 14, 15, 16, 17, 18, 19, or 20 carbon atoms. Aryl, however, does not encompass or overlap in any way with heteroaryl, separately defined herein. Hence, a multiple ring system in which one or more carbocyclic aromatic rings is fused to a heterocycloalkyl aromatic ring, is heteroaryl, not aryl, as defined herein.

"Arylalkyl" by itself or as part of another substituent refers to an acyclic alkyl radical in which one of the hydrogen atoms bonded to a carbon atom, typically a terminal or sp$^3$ carbon atom, is replaced with an aryl group. Examples of arylalkyl groups include, but are not limited to, benzyl, 2-phenylethan-1-yl, 2-phenylethen-1-yl, naphthylmethyl, 2-naphthylethan-1-yl, 2-naphthylethen-1-yl, naphthobenzyl, 2-naphthophenylethan-1-yl, and the like. Where specific alkyl moieties are intended, the nomenclature arylalkanyl, arylalkenyl, or arylalkynyl is used. In certain embodiments, an arylalkyl group is $C_{7-30}$ arylalkyl, e.g., the alkanyl, alkenyl, or alkynyl moiety of the arylalkyl group is $C_{1-10}$ and the aryl moiety is $C_{6-20}$, and in certain embodiments, an arylalkyl group is $C_{7-20}$ arylalkyl, e.g., the alkanyl, alkenyl, or alkynyl moiety of the arylalkyl group is $C_{1-8}$ and the aryl moiety is $C_{6-12}$.

Estolide "base oil" and "base stock", unless otherwise indicated, refer to any composition comprising one or more estolide compounds. It should be understood that an estolide "base oil" or "base stock" is not limited to compositions for a particular use, and may generally refer to compositions comprising one or more estolides, including mixtures of estolides. Estolide base oils and base stocks can also include compounds other than estolides.

"Compounds" refers to compounds encompassed by structural Formula I, II, and III herein and includes any specific compounds within the formula whose structure is disclosed herein. Compounds may be identified either by their chemical structure and/or chemical name. When the chemical structure and chemical name conflict, the chemical structure is determinative of the identity of the compound. The compounds described herein may contain one or more chiral centers and/or double bonds and therefore may exist as stereoisomers such as double-bond isomers (i.e., geometric isomers), enantiomers, or diastereomers. Accordingly, any chemical structures within the scope of the specification depicted, in whole or in part, with a relative configuration encompass all possible enantiomers and stereoisomers of the illustrated compounds including the stereoisomerically pure form (e.g., geometrically pure, enantiomerically pure, or diastereomerically pure) and enantiomeric and stereoisomeric mixtures. Enantiomeric and stereoisomeric mixtures may be resolved into their component enantiomers or stereoisomers using separation techniques or chiral synthesis techniques well known to the skilled artisan.

For the purposes of the present disclosure, "chiral compounds" are compounds having at least one center of chirality (i.e. at least one asymmetric atom, in particular at least one asymmetric C atom), having an axis of chirality, a plane of chirality or a screw structure. "Achiral compounds" are compounds which are not chiral.

Compounds of Formula I, II, and III include, but are not limited to, optical isomers of compounds of Formula I, II, and III, racemates thereof, and other mixtures thereof. In such embodiments, the single enantiomers or diastereomers, i.e., optically active forms, can be obtained by asymmetric synthesis or by resolution of the racemates. Resolution of the racemates may be accomplished by, for example, chromatography, using, for example a chiral high-pressure liquid chromatography (HPLC) column. However, unless otherwise stated, it should be assumed that Formula I, II, and III cover all asymmetric variants of the compounds described herein, including isomers, racemates, enantiomers, diastereomers, and other mixtures thereof. In addition, compounds of Formula I, II and III include Z- and E-forms (e.g., cis- and trans-forms) of compounds with double bonds. The compounds of Formula I, II, and III may also exist in several tautomeric forms including the enol form, the keto form, and mixtures thereof. Accordingly, the chemical structures depicted herein encompass all possible tautomeric forms of the illustrated compounds.

"Cycloalkyl" by itself or as part of another substituent refers to a saturated or unsaturated cyclic alkyl radical. Where a specific level of saturation is intended, the nomenclature "cycloalkanyl" or "cycloalkenyl" is used. Examples of cycloalkyl groups include, but are not limited to, groups derived from cyclopropane, cyclobutane, cyclopentane, cyclohexane, and the like. In certain embodiments, a cycloalkyl group is $C_{3-15}$ cycloalkyl, and in certain embodiments, $C_{3-12}$ cycloalkyl or $C_{5-12}$ cycloalkyl. In certain embodiments, a cycloalkyl group is a $C_5$, $C_6$, $C_7$, $C_8$, $C_9$, $C_{10}$, $C_{11}$, $C_{12}$, $C_{13}$, $C_{14}$, or $C_{15}$ cycloalkyl.

"Cycloalkylalkyl" by itself or as part of another substituent refers to an acyclic alkyl radical in which one of the hydrogen atoms bonded to a carbon atom, typically a terminal or sp$^3$ carbon atom, is replaced with a cycloalkyl group. Where specific alkyl moieties are intended, the nomenclature cycloalkylalkanyl, cycloalkylalkenyl, or cycloalkylalkynyl is used. In certain embodiments, a cycloalkylalkyl group is $C_{7-30}$ cycloalkylalkyl, e.g., the alkanyl, alkenyl, or alkynyl moiety of the cycloalkylalkyl group is $C_{1-10}$ and the cycloalkyl moiety is $C_{6-20}$, and in certain embodiments, a cycloalkylalkyl group is $C_{7-20}$ cycloalkylalkyl, e.g., the alkanyl, alkenyl, or alkynyl moiety of the cycloalkylalkyl group is $C_{1-8}$ and the cycloalkyl moiety is $C_{4-20}$ or $C_{6-12}$.

"Halogen" refers to a fluoro, chloro, bromo, or iodo group.

"Heteroaryl" by itself or as part of another substituent refers to a monovalent heteroaromatic radical derived by the removal of one hydrogen atom from a single atom of a parent heteroaromatic ring system. Heteroaryl encompasses multiple ring systems having at least one aromatic ring fused to at least one other ring, which can be aromatic or non-aromatic in which at least one ring atom is a heteroatom. Heteroaryl encompasses 5- to 12-membered aromatic, such as 5- to 7-membered, monocyclic rings containing one or more, for example, from 1 to 4, or in certain embodiments, from 1 to 3, heteroatoms chosen from N, O, and S, with the remaining ring atoms being carbon; and bicyclic heterocycloalkyl rings containing one or more, for example, from 1 to 4, or in certain embodiments, from 1 to 3, heteroatoms chosen from N, O, and S, with the remaining ring atoms being carbon and wherein at least one heteroatom is present in an aromatic ring. For example, heteroaryl includes a 5- to 7-membered heterocycloalkyl, aromatic ring fused to a 5- to 7-membered cycloalkyl ring. For such fused, bicyclic heteroaryl ring systems wherein only one of the rings contains one or more heteroatoms, the point of attachment may be at the heteroaromatic ring or the cycloalkyl ring. In certain embodiments, when the total number of N, S, and O atoms in the heteroaryl group exceeds one, the heteroatoms are not adjacent to one another. In certain embodiments, the total number of N, S, and O atoms in the heteroaryl group is not more than two. In certain embodiments, the total number of N, S, and O atoms in the aromatic heterocycle is not more than one. Heteroaryl does not encompass or overlap with aryl as defined herein.

Examples of heteroaryl groups include, but are not limited to, groups derived from acridine, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. In certain embodiments, a heteroaryl group is from 5- to 20-membered heteroaryl, and in certain embodiments from 5- to 12-membered heteroaryl or from 5- to 10-membered heteroaryl. In certain embodiments, a heteroaryl group is a 5-, 6-, 7-, 8-, 9-, 10-, 11-, 12-, 13-, 14-, 15-, 16-, 17-, 18-, 19-, or 20-membered heteroaryl. In certain embodiments heteroaryl groups are those derived from thiophene, pyrrole, benzothiophene, benzofuran, indole, pyridine, quinoline, imidazole, oxazole, and pyrazine.

"Heteroarylalkyl" by itself or as part of another substituent refers to an acyclic alkyl radical in which one of the hydrogen atoms bonded to a carbon atom, typically a terminal or $sp^3$ carbon atom, is replaced with a heteroaryl group. Where specific alkyl moieties are intended, the nomenclature heteroarylalkanyl, heteroarylalkenyl, or heteroarylalkynyl is used. In certain embodiments, a heteroarylalkyl group is a 6- to 30-membered heteroarylalkyl, e.g., the alkanyl, alkenyl, or alkynyl moiety of the heteroarylalkyl is 1- to 10-membered and the heteroaryl moiety is a 5- to 20-membered heteroaryl, and in certain embodiments, 6- to 20-membered heteroarylalkyl, e.g., the alkanyl, alkenyl, or alkynyl moiety of the heteroarylalkyl is 1- to 8-membered and the heteroaryl moiety is a 5- to 12-membered heteroaryl.

"Heterocycloalkyl" by itself or as part of another substituent refers to a partially saturated or unsaturated cyclic alkyl radical in which one or more carbon atoms (and any associated hydrogen atoms) are independently replaced with the same or different heteroatom. Examples of heteroatoms to replace the carbon atom(s) include, but are not limited to, N, P, O, S, Si, etc. Where a specific level of saturation is intended, the nomenclature "heterocycloalkanyl" or "heterocycloalkenyl" is used. Examples of heterocycloalkyl groups include, but are not limited to, groups derived from epoxides, azirines, thiiranes, imidazolidine, morpholine, piperazine, piperidine, pyrazolidine, pyrrolidine, quinuclidine, and the like.

"Heterocycloalkylalkyl" by itself or as part of another substituent refers to an acyclic alkyl radical in which one of the hydrogen atoms bonded to a carbon atom, typically a terminal or $sp^3$ carbon atom, is replaced with a heterocycloalkyl group. Where specific alkyl moieties are intended, the nomenclature heterocycloalkylalkanyl, heterocycloalkylalkenyl, or heterocycloalkylalkynyl is used. In certain embodiments, a heterocycloalkylalkyl group is a 6- to 30-membered heterocycloalkylalkyl, e.g., the alkanyl, alkenyl, or alkynyl moiety of the heterocycloalkylalkyl is 1- to 10-membered and the heterocycloalkyl moiety is a 5- to 20-membered heterocycloalkyl, and in certain embodiments, 6- to 20-membered heterocycloalkylalkyl, e.g., the alkanyl, alkenyl, or alkynyl moiety of the heterocycloalkylalkyl is 1- to 8-membered and the heterocycloalkyl moiety is a 5- to 12-membered heterocycloalkyl.

"Mixture" refers to a collection of molecules or chemical substances. Each component in a mixture can be independently varied. A mixture may contain, or consist essentially of, two or more substances intermingled with or without a constant percentage composition, wherein each component may or may not retain its essential original properties, and where molecular phase mixing may or may not occur. In mixtures, the components making up the mixture may or may not remain distinguishable from each other by virtue of their chemical structure.

"Parent aromatic ring system" refers to an unsaturated cyclic or polycyclic ring system having a conjugated π (pi) electron system. Included within the definition of "parent aromatic ring system" are fused ring systems in which one or more of the rings are aromatic and one or more of the rings are saturated or unsaturated, such as, for example, fluorene, indane, indene, phenalene, etc. Examples of parent aromatic ring systems include, but are not limited to, aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like.

"Parent heteroaromatic ring system" refers to a parent aromatic ring system in which one or more carbon atoms (and any associated hydrogen atoms) are independently replaced with the same or different heteroatom. Examples of heteroatoms to replace the carbon atoms include, but are not limited to, N, P, O, S, Si, etc. Specifically included within the definition of "parent heteroaromatic ring systems" are fused ring systems in which one or more of the rings are aromatic and one or more of the rings are saturated or unsaturated, such as, for example, arsindole, benzodioxan, benzofuran, chromane, chromene, indole, indoline, xanthene, etc. Examples of parent heteroaromatic ring systems include, but are not limited to, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like.

"Substituted" refers to a group in which one or more hydrogen atoms are independently replaced with the same or different substituent(s). Examples of substituents include, but are not limited to, —$R^{64}$, —$R^{60}$, —$O^-$, —OH, =O, —$OR^{60}$, —$SR^{60}$, —$S^-$, =S, —$NR^{60}R^{61}$, =$NR^{60}$, —CN, —$CF_3$, —OCN, —SCN, —NO, —$NO_2$, =$N_2$, —$N_3$, —$S(O)_2O^-$, —$S(O)_2OH$, —$S(O)_2R^{60}$, —$OS(O_2)O^-$, —$OS(O)_2R^{60}$, —$P(O)(OR^{60})(O^-)$, —$OP(O)(OR^{60})(OR^{61})$, —$C(O)R^{60}$, —$C(S)R^{60}$, —$C(O)OR^{60}$, —$C(O)NR^{60}R^{61}$, —$C(O)O^-$, —$C(S)OR^{60}$, —$NR^{62}C(O)NR^{60}R^{61}$, —$NR^{62}C(S)NR^{60}R^{61}$, $NR^{62}C(NR^{63})NR^{60}R^{61}$, —$C(NR^{62})NR^{60}R^{61}$, —$S(O)_2$, $NR^{60}R^{61}$, —$NR^{63}S(O)_2R^{60}$, —$NR^{63}C(O)R^{60}$, and —$S(O)R^{60}$;

wherein each —$R^{64}$ is independently a halogen; each $R^{60}$ and $R^{61}$ are independently alkyl, substituted alkyl, alkoxy, substituted alkoxy, cycloalkyl, substituted cycloalkyl, heterocycloalkyl, substituted heterocycloalkyl, aryl, substituted aryl, heteroaryl, substituted heteroaryl, arylalkyl, substituted arylalkyl, heteroarylalkyl, or substituted heteroarylalkyl, or $R^{60}$ and $R^{61}$ together with the nitrogen atom to which they are bonded form a heterocycloalkyl, substituted heterocycloalkyl, heteroaryl, or substituted heteroaryl ring, and $R^{62}$ and $R^{63}$ are independently alkyl, substituted alkyl, aryl, substituted aryl, arylalkyl, substituted arylalkyl, cycloalkyl, substituted cycloalkyl, heterocycloalkyl, substituted heterocycloalkyl, heteroaryl, substituted heteroaryl, heteroarylalkyl, or substituted heteroarylalkyl, or $R^{62}$ and $R^{63}$ together with the atom to which they are bonded form one or more heterocycloalkyl, substituted heterocycloalkyl, heteroaryl, or substituted heteroaryl rings;

wherein the "substituted" substituents, as defined above for $R^{60}$, $R^{61}$, $R^{62}$, and $R^{63}$, are substituted with one or more, such as one, two, or three, groups independently selected from alkyl, -alkyl-OH, —O-haloalkyl, -alkyl-$NH_2$, alkoxy, cycloalkyl, cycloalkylalkyl, heterocycloalkyl, heterocycloalkylalkyl, aryl, heteroaryl, arylalkyl, heteroarylalkyl, —$O^-$, —OH, =O, —O-alkyl, —O-aryl, —O-heteroarylalkyl, —O-cycloalkyl, —O-heterocycloalkyl, —SH, —$S^-$, =S, —S— alkyl, —S-aryl, —S-heteroarylalkyl, —S-cycloalkyl, —S-heterocycloalkyl, —NH$_2$, =NH, —CN, —CF$_3$, —OCN, —SCN, —NO, —NO$_2$, =N$_2$, —N$_3$, —S(O)$_2$O, —S(O)$_2$, —S(O)$_2$OH, —OS(O$_2$)O, —SO$_2$(alkyl), —SO$_2$(phenyl), —SO$_2$(haloalkyl), —SO$_2$NH$_2$, —SO$_2$NH(alkyl), —SO$_2$NH(phenyl), —P(O)(O)$_2$, —P(O)(O-alkyl)(O$^-$), —OP(O)(O-alkyl)(O-alkyl), —CO$_2$H, —C(O)O(alkyl), —CON(alkyl)(alkyl), —CONH(alkyl), —CONH$_2$, —C(O)(alkyl), —C(O)(phenyl), —C(O)(haloalkyl), —OC(O)(alkyl), —N(alkyl)(alkyl), —NH(alkyl), —N(alkyl)(alkylphenyl), —NH(alkylphenyl), —NHC(O)(alkyl), —NHC(O)(phenyl), —N(alkyl)C(O)(alkyl), and —N(alkyl)C(O)(phenyl).

As used in this specification and the appended claims, the articles "a," "an," and "the" include plural referents unless expressly and unequivocally limited to one referent.

All numerical ranges herein include all numerical values and ranges of all numerical values within the recited range of numerical values.

The present disclosure relates to estolide compounds, compositions and methods of making the same. In certain embodiments, the present disclosure also relates to estolide compounds, compositions comprising estolide compounds, the synthesis of such compounds, and the formulation of such compositions. In certain embodiments, the present disclosure relates to biosynthetic estolides having desired viscometric properties, while retaining or even improving other properties such as oxidative stability and pour point. In certain embodiments, new methods of preparing estolide compounds exhibiting such properties are provided. The present disclosure also relates to lubricant and lubricant-containing compositions.

In certain embodiments the composition comprises at least one estolide compound of Formula I:

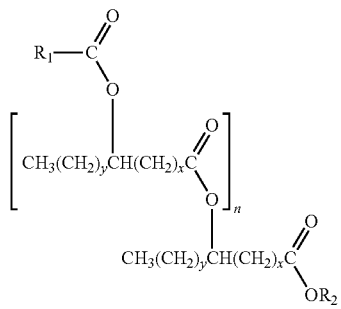

Formula I wherein x is, independently for each occurrence, an integer selected from 0, 1, 2, 3, 4, 5, 6, 7, 8, 9, 10, 11, 12, 13, 14, 15, 16, 17, 18, 19, and 20;

y is, independently for each occurrence, an integer selected from 0, 1, 2, 3, 4, 5, 6, 7, 8, 9, 10, 11, 12, 13, 14, 15, 16, 17, 18, 19, and 20;

n is an integer selected from 0, 1, 2, 3, 4, 5, 6, 7, 8, 9, 10, 11, and 12;

$R_1$ is an optionally substituted alkyl that is saturated or unsaturated, and branched or unbranched; and $R_2$ is selected from hydrogen and optionally substituted alkyl that is saturated or unsaturated, and branched or unbranched;

wherein each fatty acid chain residue of said at least one compound is independently optionally substituted.

In certain embodiments the composition comprises at least one estolide compound of Formula II:

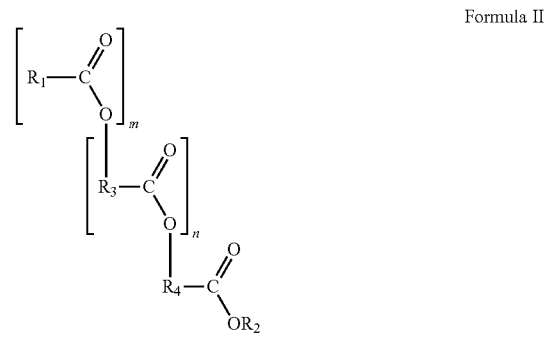

Formula II wherein m is an integer greater than or equal to 1;

n is an integer greater than or equal to 0;

$R_1$, independently for each occurrence, is an optionally substituted alkyl that is saturated or unsaturated, and branched or unbranched;

$R_2$ is selected from hydrogen and optionally substituted alkyl that is saturated or unsaturated, and branched or unbranched; and $R_3$ and $R_4$, independently for each occurrence, are selected from optionally substituted alkyl that is saturated or unsaturated, and branched or unbranched.

In certain embodiments the composition comprises at least one estolide compound of Formula III:

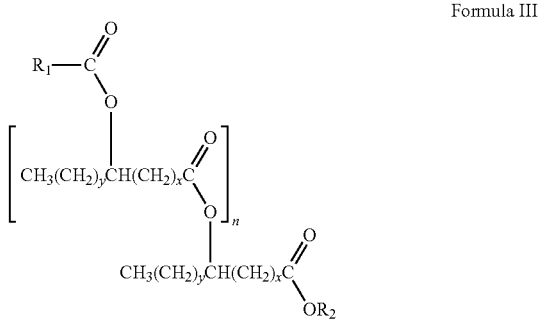

Formula III wherein x is, independently for each occurrence, an integer selected from 0 to 20;

y is, independently for each occurrence, an integer selected from 0 to 20;

n is an integer greater than or equal to 0;

$R_1$ is an optionally substituted alkyl that is saturated or unsaturated, and branched or unbranched; and $R_2$ is an optionally substituted alkyl that is saturated or unsaturated, and branched or unbranched;

wherein each fatty acid chain residue of said at least one compound is independently optionally substituted.

In certain embodiments, the composition comprises at least one estolide compound of Formula I, II, or III where $R_1$ is hydrogen.

The terms "chain" or "fatty acid chain" or "fatty acid chain residue," as used with respect to the estolide compounds of Formula I, II, and III, refer to one or more of the fatty acid residues incorporated in estolide compounds, e.g., $R_3$ or $R_4$ of Formula II, or the structures represented by $CH_3(CH_2)_y CH(CH_2)_x C(O)O$— in Formula I and III.

The $R_1$ in Formula I, II, and III at the top of each Formula shown is an example of what may be referred to as a "cap" or "capping material," as it "caps" the top of the estolide. Similarly, the capping group may be an organic acid residue of general formula —OC(O)-alkyl, i.e., a carboxylic acid with a substituted or unsubstituted, saturated or unsaturated, and/or branched or unbranched alkyl as defined herein, or a formic acid residue. In certain embodiments, the "cap" or "capping group" is a fatty acid. In certain embodiments, the capping group, regardless of size, is substituted or unsubstituted, saturated or unsaturated, and/or branched or unbranched. The cap or capping material may also be referred to as the primary or alpha (α) chain.

Depending on the manner in which the estolide is synthesized, the cap or capping group alkyl may be the only alkyl from an organic acid residue in the resulting estolide that is unsaturated. In certain embodiments, it may be desirable to use a saturated organic or fatty-acid cap to increase the overall saturation of the estolide and/or to increase the resulting estolide's stability. For example, in certain embodiments, it may be desirable to provide a method of providing a saturated capped estolide by hydrogenating an unsaturated cap using any suitable methods available to those of ordinary skill in the art. Hydrogenation may be used with various sources of the fatty-acid feedstock, which may include mono- and/or polyunsaturated fatty acids. Without being bound to any particular theory, in certain embodiments, hydrogenating the estolide may help to improve the overall stability of the molecule. However, a fully-hydrogenated estolide, such as an estolide with a larger fatty acid cap, may exhibit increased pour point temperatures. In certain embodiments, it may be desirable to offset any loss in desirable pour-point characteristics by using shorter, saturated capping materials.

The $R_4C(O)O$— of Formula II or structure $CH_3(CH_2)_y CH(CH_2)_x C(O)O$— of Formula I and III serve as the "base" or "base chain residue" of the estolide. Depending on the manner in which the estolide is synthesized, the base organic acid or fatty acid residue may be the only residue that remains in its free-acid form after the initial synthesis of the estolide. However, in certain embodiments, in an effort to alter or improve the properties of the estolide, the free acid may be reacted with any number of substituents. For example, it may be desirable to react the free acid estolide with alcohols, glycols, amines, or other suitable reactants to provide the corresponding ester, amide, or other reaction products. The base or base chain residue may also be referred to as tertiary or gamma (γ) chains.

The $R_3C(O)O$— of Formula II or structure $CH_3(CH_2)_y CH(CH_2)_x C(O)O$— of Formula I and III are linking residues that link the capping material and the base fatty-acid residue together. There may be any number of linking residues in the estolide, including when n=0 and the estolide is in its dimer form. Depending on the manner in which the estolide is prepared, a linking residue may be a fatty acid and may initially be in an unsaturated form during synthesis. In some embodiments, the estolide will be formed when a catalyst is used to produce a carbocation at the fatty acid's site of unsaturation, which is followed by nucleophilic attack on the carbocation by the carboxylic group of another fatty acid. In some embodiments, it may be desirable to have a linking fatty acid that is monounsaturated so that when the fatty acids link together, all of the sites of unsaturation are eliminated. The linking residue(s) may also be referred to as secondary or beta (β) chains.

In certain embodiments, the cap is an acetyl group, the linking residue(s) is one or more fatty acid residues, and the base chain residue is a fatty acid residue. In certain embodiments, the linking residues present in an estolide differ from one another. In certain embodiments, one or more of the linking residues differs from the base chain residue.

As noted above, in certain embodiments, suitable unsaturated fatty acids for preparing the estolides may include any mono- or polyunsaturated fatty acid. For example, monounsaturated fatty acids, along with a suitable catalyst, will form a single carbocation that allows for the addition of a second fatty acid, whereby a single link between two fatty acids is formed. Suitable monounsaturated fatty acids may include, but are not limited to, palmitoleic acid (16:1), vaccenic acid (18:1), oleic acid (18:1), eicosenoic acid (20:1), erucic acid (22:1), and nervonic acid (24:1). In addition, in certain embodiments, polyunsaturated fatty acids may be used to create estolides. Suitable polyunsaturated fatty acids may include, but are not limited to, hexadecatrienoic acid (16:3), alpha-linolenic acid (18:3), stearidonic acid (18:4), eicosatrienoic acid (20:3), eicosatetraenoic acid (20:4), eicosapentaenoic acid (20:5), heneicosapentaenoic acid (21:5), docosapentaenoic acid (22:5), docosahexaenoic acid (22:6), tetracosapentaenoic acid (24:5), tetracosahexaenoic acid (24:6), linoleic acid (18:2), gamma-linoleic acid (18:3), eicosadienoic acid (20:2), dihomo-gamma-linolenic acid (20:3), arachidonic acid (20:4), docosadienoic acid (20:2), adrenic acid (22:4), docosapentaenoic acid (22:5), tetracosatetraenoic acid (22:4), tetracosapentaenoic acid (24:5), pinolenic acid (18:3), podocarpic acid (20:3), rumenic acid (18:2), alpha-calendic acid (18:3), beta-calendic acid (18:3), jacaric acid (18:3), alpha-eleostearic acid (18:3), beta-eleostearic (18:3), catalpic acid (18:3), punicic acid (18:3), rumelenic acid (18:3), alpha-parinaric acid (18:4), beta-parinaric acid (18:4), and bosseopentaenoic acid (20:5). In certain embodiments, hydroxy fatty acids may be polymerized or homopolymerized by reacting the carboxylic acid functionality of one fatty acid with the hydroxy functionality of a second fatty acid. Exemplary hydroxyl fatty acids include, but are not limited to, ricinoleic acid, 6-hydroxystearic acid, 9,10-dihydroxystearic acid, 12-hydroxystearic acid, and 14-hydroxystearic acid.

The process for preparing the estolide compounds described herein may include the use of any natural or synthetic fatty acid source. However, it may be desirable to source the fatty acids from a renewable biological feedstock. For example, suitable starting materials of biological origin include, but are not limited to, plant fats, plant oils, plant waxes, animal fats, animal oils, animal waxes, fish fats, fish oils, fish waxes, algal oils and mixtures of two or more thereof. Other potential fatty acid sources include, but are not limited to, waste and recycled food-grade fats and oils, fats, oils, and waxes obtained by genetic engineering, fossil fuel-based materials and other sources of the materials desired.

In some embodiments, the estolide comprises fatty-acid chains of varying lengths. In some embodiments, x is, independently for each occurrence, an integer selected from 0 to 20, 0 to 18, 0 to 16, 0 to 14, 1 to 12, 1 to 10, 2 to 8, 6 to 8, or 4 to 6. In some embodiments, x is, independently for each occurrence, an integer selected from 7 and 8. In some embodiments, x is, independently for each occurrence, an integer selected from 0, 1, 2, 3, 4, 5, 6, 7, 8, 9, 10, 11, 12, 13, 14, 15, 16, 17, 18, 19, and 20.

In some embodiments, y is, independently for each occurrence, an integer selected from 0 to 20, 0 to 18, 0 to 16, 0 to 14, 1 to 12, 1 to 10, 2 to 8, 6 to 8, or 4 to 6. In some embodiments, y is, independently for each occurrence, an integer selected from 7 and 8. In some embodiments, y is, independently for each occurrence, an integer selected from 0, 1, 2, 3, 4, 5, 6, 7, 8, 9, 10, 11, 12, 13, 14, 15, 16, 17, 18, 19, and 20.

In some embodiments, x+y is, independently for each chain, an integer selected from 0 to 40, 0 to 20, 10 to 20, or 12 to 18. In some embodiments, x+y is, independently for each chain, an integer selected from 13 to 15. In some embodiments, x+y is 15. In some embodiments, x+y is, independently for each chain, an integer selected from 6, 7, 8, 9, 10, 11, 12, 13, 14, 15, 16, 17, 18, 19, 20, 21, 22, 23, and 24.

In some embodiments, the estolide compound of Formula I, II, or III may comprise any number of fatty acid residues to form an "n-mer" estolide. For example, the estolide may be in its dimer (n=0), trimer (n=1), tetramer (n=2), pentamer (n=3), hexamer (n=4), heptamer (n=5), octamer (n=6), nonamer (n=7), or decamer (n=8) form. In some embodiments, n is an integer selected from 0 to 20, 0 to 18, 0 to 16, 0 to 14, 0 to 12, 0 to 10, 0 to 8, or 0 to 6. In some embodiments, n is an integer selected from 0 to 4. In some embodiments, n is 1, wherein said at least one compound of Formula I, II, or III comprises the trimer. In some embodiments, n is greater than 1. In some embodiments, n is an integer selected from 0, 1, 2, 3, 4, 5, 6, 7, 8, 9, 10, 11, 12, 13, 14, 15, 16, 17, 18, 19, and 20.

In some embodiments, $R_1$ of Formula I, II, or III is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_1$ is selected from $C_7$ alkyl, $C_9$ alkyl, $C_{11}$ alkyl, $C_{13}$ alkyl, $C_{15}$ alkyl, and $C_{17}$ alkyl. In some embodiments, $R_1$ is selected from $C_{13}$ to $C_{17}$ alkyl, such as from $C_{13}$ alkyl, $C_{15}$ alkyl, and $C_{17}$ alkyl. In some embodiments, $R_1$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

In some embodiments, $R_2$ of Formula I, II, or III is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_2$ is selected from $C_7$ alkyl, $C_9$ alkyl, $C_{11}$ alkyl, $C_{13}$ alkyl, $C_{15}$ alkyl, and $C_{17}$ alkyl. In some embodiments, $R_2$ is selected from $C_{13}$ to $C_{17}$ alkyl, such as from $C_{13}$ alkyl, $C_{15}$ alkyl, and $C_{17}$ alkyl. In some embodiments, $R_2$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

In some embodiments, $R_3$ is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_3$ is selected from $C_7$ alkyl, $C_9$ alkyl, $C_{11}$ alkyl, $C_{13}$ alkyl, $C_{is}$ alkyl, and $C_{17}$ alkyl. In some embodiments, $R_3$ is selected from $C_{13}$ to $C_{17}$ alkyl, such as from $C_{13}$ alkyl, $C_{15}$ alkyl, and $C_{17}$ alkyl. In some embodiments, $R_3$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

In some embodiments, $R_4$ is an optionally substituted alkyl that is saturated or unsaturated, and branched or unbranched. In some embodiments, the alkyl group is a $C_1$ to $C_{40}$ alkyl, $C_1$ to $C_{22}$ alkyl or $C_1$ to $C_{18}$ alkyl. In some embodiments, the alkyl group is selected from $C_7$ to $C_{17}$ alkyl. In some embodiments, $R_4$ is selected from $C_7$ alkyl, $C_9$ alkyl, $C_{11}$ alkyl, $C_{13}$ alkyl, $C_{15}$ alkyl, and $C_{17}$ alkyl. In some embodiments, $R_4$ is selected from $C_{13}$ to $C_{17}$ alkyl, such as from $C_{13}$ alkyl, $C_{15}$ alkyl, and $C_{17}$ alkyl. In some embodiments, $R_4$ is a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, or $C_{22}$ alkyl.

As noted above, in certain embodiments, it may be possible to manipulate one or more of the estolides' properties by altering the length of $R_1$ and/or its degree of saturation. However, in certain embodiments, the level of substitution on $R_1$ may also be altered to change or even improve the estolides' properties. Without being bound to any particular theory, in certain embodiments, it is believed that the presence of polar substituents on $R_1$, such as one or more hydroxy groups, may increase the viscosity of the estolide, while increasing pour point. Accordingly, in some embodiments, $R_1$ will be unsubstituted or optionally substituted with a group that is not hydroxyl.

In some embodiments, the estolide is in its free-acid form, wherein $R_2$ of Formula I, II, or III is hydrogen. In some embodiments, $R_2$ is selected from optionally substituted alkyl that is saturated or unsaturated, and branched or unbranched. In certain embodiments, the $R_2$ residue may comprise any desired alkyl group, such as those derived from esterification of the estolide with the alcohols identified in the examples herein. In some embodiments, the alkyl group is selected from $C_1$ to $C_{40}$, $C_1$ to $C_{22}$, $C_3$ to $C_{20}$, $C_1$ to $C_{18}$, or $C_6$ to $C_{12}$ alkyl. In some embodiments, $R_2$ may be selected from $C_3$ alkyl, $C_4$ alkyl, $C_8$ alkyl, $C_{12}$ alkyl, $C_{16}$ alkyl, $C_{18}$ alkyl, and $C_{20}$ alkyl. For example, in certain embodiments, $R_2$ may be branched, such as isopropyl, isobutyl, or 2-ethylhexyl. In some embodiments, $R_2$ may be a larger alkyl group, branched or unbranched, comprising $C_{12}$ alkyl, $C_{16}$ alkyl, $C_{18}$ alkyl, or $C_{20}$ alkyl. Such groups at the $R_2$ position may be derived from esterification of the free-acid estolide using the Jarcol™ line of alcohols marketed by Jarchem Industries, Inc. of Newark, N.J., including Jarcoff I-18CG, I-20, I-12, I-16, I-18T, and 85BJ. In some cases, $R_2$ may be sourced from certain alcohols to provide branched alkyls such as isostearyl and isopalmityl. It should be understood that such isopalmityl and isostearyl alkyl groups may cover any branched variation of $C_{16}$ and $C_{18}$, respectively. For example, the estolides described herein may comprise highly-branched isopalmityl or isostearyl groups at the $R_2$ position, derived from the Fineoxocol® line of isopalmityl and isostearyl alcohols marketed by Nissan Chemical America Corporation of Houston, Tex., including Fineoxocol® 180, 180N, and 1600. Without being bound to any particular theory, in certain embodiments, large, highly-branched alkyl groups (e.g., isopalmityl and isostearyl) at the $R_2$ position of the estolides can provide at least one way to increase an estolide-containing composition's viscosity, while substantially retaining or even reducing its pour point.

In some embodiments, the compounds described herein may comprise a mixture of two or more estolide compounds of Formula I, II, and III. It is possible to characterize the chemical makeup of an estolide, a mixture of estolides, or a composition comprising estolides, by using the compound's, mixture's, or composition's measured estolide number (EN) of compound or composition. The EN represents the average number of fatty acids added to the base fatty acid. The EN also represents the average number of estolide linkages per molecule:

$$EN=n+1$$

wherein n is the number of secondary (β) fatty acids. Accordingly, a single estolide compound will have an EN that is a whole number, for example for dimers, trimers, and tetramers:

dimer EN=1 trimer EN=2 tetramer EN=3

However, a composition comprising two or more estolide compounds may have an EN that is a whole number or a fraction of a whole number. For example, a composition having a 1:1 molar ratio of dimer and trimer would have an EN of 1.5, while a composition having a 1:1 molar ratio of tetramer and trimer would have an EN of 2.5.

In some embodiments, the compositions may comprise a mixture of two or more estolides having an EN that is an integer or fraction of an integer that is greater than 4.5, or even 5.0. In some embodiments, the EN may be an integer or fraction of an integer selected from about 1.0 to about 5.0. In some embodiments, the EN is an integer or fraction of an integer selected from 1.2 to about 4.5. In some embodiments, the EN is selected from a value greater than 1.0, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6 and 5.8. In some embodiments, the EN is selected from a value less than 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, and 5.0, 5.2, 5.4, 5.6, 5.8, and 6.0. In some embodiments, the EN is selected from 1, 1.2, 1.4, 1.6, 1.8, 2.0, 2.2, 2.4, 2.6, 2.8, 3.0, 3.2, 3.4, 3.6, 3.8, 4.0, 4.2, 4.4, 4.6, 4.8, 5.0, 5.2, 5.4, 5.6, 5.8, and 6.0.

As noted above, it should be understood that the chains of the estolide compounds may be independently optionally substituted, wherein one or more hydrogens are removed and replaced with one or more of the substituents identified herein. Similarly, two or more of the hydrogen residues may be removed to provide one or more sites of unsaturation, such as a cis or trans double bond. Further, the chains may optionally comprise branched hydrocarbon residues. For example, in some embodiments the estolides described herein may comprise at least one compound of Formula II:

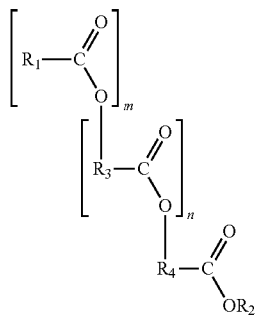

Formula II wherein
m is an integer equal to or greater than 1;
n is an integer equal to or greater than 0;
$R_1$, independently for each occurrence, is an optionally substituted alkyl that is saturated or unsaturated, and branched or unbranched;
$R_2$ is selected from hydrogen and optionally substituted alkyl that is saturated or unsaturated, and branched or unbranched; and $R_3$ and $R_4$, independently for each occurrence, are selected from optionally substituted alkyl that is saturated or unsaturated, and branched or unbranched.

In certain embodiments, m is 1. In some embodiments, m is an integer selected from 2, 3, 4, and 5. In some embodiments, n is an integer selected from 1, 2, 3, 4, 5, 6, 7, 8, 9, 10, 11, and 12. In some embodiments, one or more $R_3$ differs from one or more other $R_3$ in a compound of Formula II. In some embodiments, one or more $R_3$ differs from $R_4$ in a compound of Formula II. In some embodiments, if the compounds of Formula II are prepared from one or more polyunsaturated fatty acids, it is possible that one or more of $R_3$ and $R_4$ will have one or more sites of unsaturation. In some embodiments, if the compounds of Formula II are prepared from one or more branched fatty acids, it is possible that one or more of $R_3$ and $R_4$ will be branched.

In some embodiments, $R_3$ and $R_4$ can be $CH_3(CH_2)_yCH(CH_2)_x$—, where x is, independently for each occurrence, an integer selected from 0, 1, 2, 3, 4, 5, 6, 7, 8, 9, 10, 11, 12, 13, 14, 15, 16, 17, 18, 19, and 20, and y is, independently for each occurrence, an integer selected from 0, 1, 2, 3, 4, 5, 6, 7, 8, 9, 10, 11, 12, 13, 14, 15, 16, 17, 18, 19, and 20. Where both $R_3$ and $R_4$ are $CH_3(CH_2)_yCH(CH_2)_x$—, the compounds may be compounds according to Formula I and III.

Without being bound to any particular theory, in certain embodiments, altering the EN produces estolide-containing compositions having desired viscometric properties while substantially retaining or even reducing pour point. For example, in some embodiments the estolides exhibit a decreased pour point upon increasing the EN value. Accordingly, in certain embodiments, a method is provided for retaining or decreasing the pour point of an estolide base oil by increasing the EN of the base oil, or a method is provided for retaining or decreasing the pour point of a composition comprising an estolide base oil by increasing the EN of the base oil. In some embodiments, the method comprises: selecting an estolide base oil having an initial EN and an initial pour point; and removing at least a portion of the base oil, said portion exhibiting an EN that is less than the initial EN of the base oil, wherein the resulting estolide base oil exhibits an EN that is greater than the initial EN of the base oil, and a pour point that is equal to or lower than the initial pour point of the base oil. In some embodiments, the selected estolide base oil is prepared by oligomerizing at least one first unsaturated fatty acid with at least one second unsaturated fatty acid and/or saturated fatty acid. In some embodiments, the removing at least a portion of the base oil or a composition comprising two or more estolide compounds is accomplished by use of at least one of distillation, chromatography, membrane separation, phase separation, affinity separation, and solvent extraction. In some embodiments, the distillation takes place at a temperature and/or pressure that is suitable to separate the estolide base oil or a composition comprising two or more estolide compounds into different "cuts" that individually exhibit different EN values. In some embodiments, this may be accomplished by subjecting the base oil or a composition comprising two or more estolide compounds to a temperature of at least about 250° C. and an absolute pressure of no greater than about 25 microns. In some embodiments, the distillation takes place at a temperature range of about 250° C. to about 310° C. and an absolute pressure range of about 10 microns to about 25 microns.

In some embodiments, estolide compounds and compositions exhibit an EN that is greater than or equal to 1, such as an integer or fraction of an integer selected from about 1.0 to about 2.0. In some embodiments, the EN is an integer or fraction of an integer selected from about 1.0 to about 1.6. In some embodiments, the EN is a fraction of an integer selected from about 1.1 to about 1.5. In some embodiments, the EN is selected from a value greater than 1.0, 1.1, 1.2, 1.3, 1.4, 1.5, 1.6, 1.7, 1.8, and 1.9. In some embodiments, the EN is selected from a value less than 1.1, 1.2, 1.3, 1.4, 1.5, 1.6, 1.7, 1.8, 1.9, and 2.0.

In some embodiments, the EN is greater than or equal to 1.5, such as an integer or fraction of an integer selected from about 1.8 to about 2.8. In some embodiments, the EN is an integer or fraction of an integer selected from about 2.0 to about 2.6. In some embodiments, the EN is a fraction of an integer selected from about 2.1 to about 2.5. In some embodiments, the EN is selected from a value greater than 1.8, 1.9, 2.0, 2.1, 2.2, 2.3, 2.4, 2.5, 2.6, and 2.7. In some embodiments, the EN is selected from a value less than 1.9, 2.0, 2.1, 2.2, 2.3, 2.4, 2.5, 2.6, 2.7, and 2.8. In some embodiments, the EN is about 1.8, 2.0, 2.2, 2.4, 2.6, or 2.8.

In some embodiments, the EN is greater than or equal to about 4, such as an integer or fraction of an integer selected from about 4.0 to about 5.0. In some embodiments, the EN is a fraction of an integer selected from about 4.2 to about 4.8. In some embodiments, the EN is a fraction of an integer selected from about 4.3 to about 4.7. In some embodiments, the EN is selected from a value greater than 4.0, 4.1, 4.2, 4.3, 4.4, 4.5, 4.6, 4.7, 4.8, and 4.9. In some embodiments, the EN is selected from a value less than 4.1, 4.2, 4.3, 4.4, 4.5, 4.6, 4.7, 4.8, 4.9, and 5.0. In some embodiments, the EN is about 4.0, 4.2, 4.4, 4.6, 4.8, or 5.0.

In some embodiments, the EN is greater than or equal to about 5, such as an integer or fraction of an integer selected from about 5.0 to about 6.0. In some embodiments, the EN is a fraction of an integer selected from about 5.2 to about 5.8. In some embodiments, the EN is a fraction of an integer selected from about 5.3 to about 5.7. In some embodiments, the EN is selected from a value greater than 5.0, 5.1, 5.2, 5.3, 5.4, 5.5, 5.6, 5.7, 5.8, and 5.9. In some embodiments, the EN is selected from a value less than 5.1, 5.2, 5.3, 5.4, 5.5, 5.6, 5.7, 5.8, 5.9, and 6.0. In some embodiments, the EN is about 5.0, 5.2, 5.4, 5.4, 5.6, 5.8, or 6.0.

In some embodiments, the EN is greater than or equal to 1, such as an integer or fraction of an integer selected from about 1.0 to about 2.0. In some embodiments, the EN is a fraction of an integer selected from about 1.1 to about 1.7. In some embodiments, the EN is a fraction of an integer selected from about 1.1 to about 1.5. In some embodiments, the EN is selected from a value greater than 1.0, 1.1, 1.2, 1.3, 1.4, 1.5, 1.6, 1.7, 1.8, or 1.9. In some embodiments, the EN is selected from a value less than 1.2, 1.3, 1.4, 1.5, 1.6, 1.7, 1.8, 1.9, or 2.0. In some embodiments, the EN is about 1.0, 1.2, 1.4, 1.6, 1.8, or 2.0. In some embodiments, the EN is greater than or equal to 1, such as an integer or fraction of an integer selected from about 1.2 to about 2.2. In some embodiments, the EN is an integer or fraction of an integer selected from about 1.4 to about 2.0. In some embodiments, the EN is a fraction of an integer selected from about 1.5 to about 1.9. In some embodiments, the EN is selected from a value greater than 1.0, 1.1. 1.2, 1.3, 1.4, 1.5, 1.6, 1.7, 1.8, 1.9, 2.0, and 2.1. In some embodiments, the EN is selected from a value less than 1.2, 1.3, 1.4, 1.5, 1.6, 1.7, 1.8, 1.9, 2.0, 2.1, and 2.2. In some embodiments, the EN is about 1.0, 1.2, 1.4, 1.6, 1.8, 2.0, or 2.2.

In some embodiments, the EN is greater than or equal to 2, such as an integer or fraction of an integer selected from about 2.8 to about 3.8. In some embodiments, the EN is an integer or fraction of an integer selected from about 2.9 to about 3.5. In some embodiments, the EN is an integer or fraction of an integer selected from about 3.0 to about 3.4. In some embodiments, the EN is selected from a value greater than 2.0, 2.1, 2.2., 2.4, 2.5, 2.6, 2.7, 2.8, 2.9, 3.0, 3.1, 3.4, 3.5, 3.6, and 3.7. In some embodiments, the EN is selected from a value less than 2.2, 2.3, 2.4, 2.5, 2.6, 2.7, 2.8, 2.9, 3.0, 3.1, 3.2, 3.3, 3.4, 3.5, 3.6, 3.7, and 3.8. In some embodiments, the EN is about 2.0, 2.2, 2.4, 2.6, 2.8, 3.0, 3.2, 3.4, 3.6, or 3.8. Typically, base stocks and estolide-containing compositions exhibit certain lubricity, viscosity, and/or pour point characteristics. For example, in certain embodiments, the base oils, compounds, and compositions may exhibit viscosities that range from about 10 cSt to about 250 cSt at 40° C., and/or about 3 cSt to about 30 cSt at 100° C. In some embodiments, the base oils, compounds, and compositions may exhibit viscosities within a range from about 50 cSt to about 150 cSt at 40° C., and/or about 10 cSt to about 20 cSt at 100° C.

In some embodiments, the estolide compounds and compositions may exhibit viscosities less than about 55 cSt at 40° C. or less than about 45 cSt at 40° C., and/or less than about 12 cSt at 100° C. or less than about 10 cSt at 100° C. In some embodiments, the estolide compounds and compositions may exhibit viscosities within a range from about 25 cSt to about 55 cSt at 40° C., and/or about 5 cSt to about 11 cSt at 100° C. In some embodiments, the estolide compounds and compositions may exhibit viscosities within a range from about 35 cSt to about 45 cSt at 40° C., and/or about 6 cSt to about 10 cSt at 100° C. In some embodiments, the estolide compounds and compositions may exhibit viscosities within a range from about 38 cSt to about 43 cSt at 40° C., and/or about 7 cSt to about 9 cSt at 100° C.

In some embodiments, the estolide compounds and compositions may exhibit viscosities less than about 120 cSt at 40° C. or less than about 100 cSt at 40° C., and/or less than about 18 cSt at 100° C. or less than about 17 cSt at 100° C. In some embodiments, the estolide compounds and compositions may exhibit a viscosity within a range from about 70 cSt to about 120 cSt at 40° C., and/or about 12 cSt to about 18 cSt at 100° C. In some embodiments, the estolide compounds and compositions may exhibit viscosities within a range from about 80 cSt to about 100 cSt at 40° C., and/or about 13 cSt to about 17 cSt at 100° C. In some embodiments, the estolide compounds and compositions may exhibit viscosities within a range from about 85 cSt to about 95 cSt at 40° C., and/or about 14 cSt to about 16 cSt at 100° C.

In some embodiments, the estolide compounds and compositions may exhibit viscosities greater than about 180 cSt at 40° C. or greater than about 200 cSt at 40° C., and/or greater than about 20 cSt at 100° C. or greater than about 25 cSt at 100° C. In some embodiments, the estolide compounds and compositions may exhibit a viscosity within a range from about 180 cSt to about 230 cSt at 40° C., and/or about 25 cSt to about 31 cSt at 100° C. In some embodiments, the estolide compounds and compositions may exhibit viscosities within a range from about 200 cSt to about 250 cSt at 40° C., and/or about 25 cSt to about 35 cSt at 100° C. In some embodiments, the estolide compounds and compositions may exhibit viscosities within a range from about 210 cSt to about 230 cSt at 40° C., and/or about 28 cSt to about 33 cSt at 100° C. In some embodiments, the estolide compounds and compositions may exhibit viscosities within a range from about 200 cSt to about 220 cSt at 40° C., and/or about 26 cSt to about 30 cSt at 100° C. In some embodiments, the estolide compounds and compositions may exhibit viscosities within a range from about 205 cSt to about 215 cSt at 40° C., and/or about 27 cSt to about 29 cSt at 100° C.

In some embodiments, the estolide compounds and compositions may exhibit viscosities less than about 45 cSt at 40° C. or less than about 38 cSt at 40° C., and/or less than about 10 cSt at 100° C. or less than about 9 cSt at 100° C. In some embodiments, the estolide compounds and compositions may exhibit a viscosity within a range from about 20 cSt to about 45 cSt at 40° C., and/or about 4 cSt to about 10 cSt at 100° C. In some embodiments, the estolide compounds and compositions may exhibit viscosities within a range from about 28 cSt to about 38 cSt at 40° C., and/or about 5 cSt to about 9 cSt at 100° C. In some embodiments, the estolide compounds and compositions may exhibit viscosities within a range from about 30 cSt to about 35 cSt at 40° C., and/or about 6 cSt to about 8 cSt at 100° C.

In some embodiments, the estolide compounds and compositions may exhibit viscosities less than about 80 cSt at 40° C. or less than about 70 cSt at 40° C., and/or less than about 14 cSt at 100° C. or less than about 13 cSt at 100° C. In some embodiments, the estolide compounds and compositions may exhibit a viscosity within a range from about 50 cSt to about 80 cSt at 40° C., and/or about 8 cSt to about 14 cSt at 100° C. In some embodiments, the estolide compounds and compositions may exhibit viscosities within a range from about 60 cSt to about 70 cSt at 40° C., and/or about 9 cSt to about 13 cSt at 100° C. In some embodiments, the estolide compounds and compositions may exhibit viscosities within a range from about 63 cSt to about 68 cSt at 40° C., and/or about 10 cSt to about 12 cSt at 100° C.

In some embodiments, the estolide compounds and compositions may exhibit viscosities greater than about 120 cSt at 40° C. or greater than about 130 cSt at 40° C., and/or greater than about 15 cSt at 100° C. or greater than about 18 cSt at 100° C. In some embodiments, the estolide compounds and compositions may exhibit a viscosity within a range from about 120 cSt to about 150 cSt at 40° C., and/or about 16 cSt to about 24 cSt at 100° C. In some embodiments, the estolide compounds and compositions may exhibit viscosities within a range from about 130 cSt to about 160 cSt at 40° C., and/or about 17 cSt to about 28 cSt at 100° C. In some embodiments, the estolide compounds and compositions may exhibit viscosities within a range from about 130 cSt to about 145 cSt at 40° C., and/or about 17 cSt to about 23 cSt at 100° C. In some embodiments, the estolide compounds and compositions may exhibit viscosities within a range from about 135 cSt to about 140 cSt at 40° C., and/or about 19 cSt to about 21 cSt at 100° C. In some embodiments, the estolide compounds and compositions may exhibit viscosities of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 42, 44, 46, 48, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 350, or 400 cSt. at 40° C. In some embodiments, the estolide compounds and compositions may exhibit viscosities of about 1, 2, 3, 4, 5, 6, 7, 8, 9, 10, 11, 12, 13, 14, 15, 16, 17, 18, 19, 20, 21, 22, 23, 24, 25, 26, 27, 28, 29, and 30 cSt at 100° C.

In some embodiments, the estolide compounds and compositions may exhibit viscosities less than about 200, 250, 300, 350, 400, 450, 500, or 550 cSt at 0° C. In some embodiments, the estolide compounds and compositions may exhibit a viscosity within a range from about 200 cSt to about 250 cSt at 0° C. In some embodiments, the estolide compounds and compositions may exhibit a viscosity within a range from about 250 cSt to about 300 cSt at 0° C. In some embodiments, the estolide compounds and compositions may exhibit a viscosity within a range from about 300 cSt to about 350 cSt at 0° C. In some embodiments, the estolide compounds and compositions may exhibit a viscosity within a range from about 350 cSt to about 400 cSt at 0° C. In some embodiments, the estolide compounds and compositions may exhibit a viscosity within a range from about 400 cSt to about 450 cSt at 0° C. In some embodiments, the estolide compounds and compositions may exhibit a viscosity within a range from about 450 cSt to about 500 cSt at 0° C. In some embodiments, the estolide compounds and compositions may exhibit a viscosity within a range from about 500 cSt to about 550 cSt at 0° C. In some embodiments, the estolide compounds and compositions may exhibit viscosities of about 100, 125, 150, 175, 200, 225, 250, 275, 300, 325, 350, 375, 400, 425, 450, 475, 500, 525, or 550 cSt at 0° C.

In some embodiments, estolide compounds and compositions may exhibit desirable low-temperature pour point properties. In some embodiments, the estolide compounds and compositions may exhibit a pour point lower than about −25° C., about −35° C., −40° C., or even about −50° C. In some embodiments, the estolide compounds and compositions have a pour point of about −25° C. to about −45° C. In some embodiments, the pour point falls within a range of about −30° C. to about −40° C., about −34° C. to about −38° C., about −30° C. to about −45° C., −35° C. to about −45° C., 34° C. to about −42° C., about −38° C. to about −42° C., or about 36° C. to about −40° C. In some embodiments, the pour point falls within the range of about −27° C. to about −37° C., or about −30° C. to about −34° C. In some embodiments, the pour point falls within the range of about −25° C. to about −35° C., or about −28° C. to about −32° C. In some embodiments, the pour point falls within the range of about −28° C. to about −38° C., or about −31° C. to about −35° C. In some embodiments, the pour point falls within the range of about −31° C. to about −41° C., or about −34° C. to about −38° C. In some embodiments, the pour point falls within the range of about −40° C. to about −50° C., or about −42° C. to about −48° C. In some embodiments, the pour point falls within the range of about −50° C. to about −60° C., or about −52° C. to about −58° C. In some embodiments, the upper bound of the pour point is less than about −35° C., about −36° C., about −37° C., about −38° C., about −39° C., about −40° C., about −41° C., about −42° C., about −43° C., about −44° C., or about −45° C. In some embodiments, the lower bound of the pour point is greater than about −70° C., about −69° C., about −68° C., about −67° C., about −66° C., about −65° C., about −64° C., about −63° C., about −62° C., about −61° C., about −60° C., about −59° C., about −58° C., about −57° C., about −56° C., −55° C., about −54° C., about −53° C., about −52° C., −51, about −50° C., about −49° C., about −48° C., about −47° C., about −46° C., or about −45° C.

In addition, in certain embodiments, the estolides may exhibit decreased Iodine Values (IV) when compared to estolides prepared by other methods. IV is a measure of the degree of total unsaturation of an oil, and is determined by measuring the amount of iodine per gram of estolide (cg/g). In certain instances, oils having a higher degree of unsaturation may be more susceptible to creating corrosiveness and deposits, and may exhibit lower levels of oxidative stability. Compounds having a higher degree of unsaturation will have more points of unsaturation for iodine to react with, resulting in a higher IV. Thus, in certain embodiments, it may be desirable to reduce the IV of estolides in an effort to increase the oil's oxidative stability, while also decreasing harmful deposits and the corrosiveness of the oil.

In some embodiments, estolide compounds and compositions described herein have an IV of less than about 40 cg/g or less than about 35 cg/g. In some embodiments, estolides have an IV of less than about 30 cg/g, less than about 25 cg/g, less than about 20 cg/g, less than about 15 cg/g, less than about 10 cg/g, or less than about 5 cg/g. The IV of a composition may be reduced by decreasing the estolide's degree of unsaturation. This may be accomplished by, for example, by increasing the amount of saturated capping materials relative to unsaturated capping materials when synthesizing the estolides. Alternatively, in certain embodiments, IV may be reduced by hydrogenating estolides having unsaturated caps.

In certain embodiments, the estolide compounds and compositions described herein may be used to prepare lubricants and other compositions. In certain embodiments, the composition comprises at least one estolide compound selected from Formulas I, II, and III. In certain embodiments, the at least one estolide compound is present in amounts of about 0 to about 100 wt. % of the composition, such as about 0.1 to about 99 wt. %. In certain embodiments, the at least one estolide compound is present in amounts of about 0 to about 90, about 0 to about 80, about 0 to about 70, about 0 to about 60, about 0 to about 50, about 0 to about 40, about 0 to about 30, about 0 to about 20, or about 0 to about 10 wt. % of the composition. In certain embodiments, the at least one estolide compound is present in amounts of about 25 to about 95 wt. % of the composition, such as about 50 to about 75 wt %. In certain embodiments, the at least one estolide compound is present in amounts of about 5, 10, 15, 20, 25, 30, 35, 40, 45, 50, 55, 60, 65, 70, 75, 80, 85, 90, 95, or 100 wt. %. In certain embodiments, the at least one estolide compound is present in amounts of about 50, 52, 54, 56, 58, 60, 62, 64, 66, 68, 70, 72, 74, 76, 78, 80, 82, 84, 86, 88, 90, 92, 94, 96, or 98 wt. %.

In certain embodiments, the composition comprising the at least one estolide is a refrigerating fluid. In certain embodiments, the refrigerating fluid further comprises at least one refrigerant. As used herein, the term "refrigerant" refers to compounds and chemicals that are suitable for use as heat-transfer fluids in, for example, refrigeration and air conditioning equipment. In certain embodiments, the at least one refrigerant comprises one or more compounds selected from fluorocarbon refrigerants, hydrocarbon refrigerants, carbon dioxide, sulfur dioxide, and ammonia. In certain embodiments, the at least one refrigerant is a fluorocarbon refrigerant comprising one or more compounds selected from chlorofluorocarbons (CFC), hydrochlorofluorocarbons (HCFC), and hydrofluorocarbons (HFC). In certain embodiments, the at least one refrigerant comprises one or more compounds selected from fluorine-containing ether refrigerants and non-fluorine containing ether refrigerants.

In certain embodiments, the at least one refrigerant is an HCFC refrigerant selected from chlorodifluoromethane (R-22), dichlorofluoromethane (R-21), and bromochlorodifluoromethane (BCF). In certain embodiments, the HFC refrigerant is selected from hydrofluorocarbons having 1 to 3 or 1 to 2 carbon atoms. Exemplary HFCs include, but are not limited to, difluoromethane (HFC-32), trifluoromethane (HFC-23), pentafluoroethane (HFC-125), 1,1,2,2-tetrafluoroethane (HFC-134), 1,1,1,2-tetrafluoroethane (HFC-134a), 1,1,1-trifluoroethane (HFC-143a), and 1,1-difluoroethane (HFC-152a). In certain embodiments, the at least one refrigerant is selected from HFC-32; HFC-23; HFC-134a; HFC-125; a mixture of HFC-134a/HFC-32, such as 60 to 80% by mass and 40 to 20% by mass, respectively; a mixture of HFC-32/HFC-125, such as 40 to 70% by mass and 60 to 30% by mass, respectively; a mixture of HFC-125/HFC-143a, such as 40 to 60% by mass and 60 to 40% by mass, respectively; a mixture of HFC-134a/HFC-32/HFC-125, such as 60% by mass/30% by mass/10% by mass, respectively; a mixture of HFC-134a/HFC-32/HFC-125, such as 40 to 70% by mass/15 to 35% by mass/5 to 40% by mass, respectively; and a mixture of HFC-125/HFC-134a/HFC-143a, such as 35 to 55% by mass/1 to 15% by mass/40 to 60% by mass, respectively. In certain embodiments, the at least one refrigerant is selected from HFC-134a/HFC-32, such as 70/30% by mass, respectively; a mixture of HFC-32/HFC-125, such as 60/40% by mass, respectively; a mixture of HFC-32/HFC-125, such as 50/50% by mass (R410A); a mixture of HFC-32/HFC-125, such as 45/55% by mass, respectively (R410B); a mixture of HFC-125/HFC-143a, such as 50/50% by mass (R507c); a mixture of HFC-32/1-TFC-125/HFC-134a, such as 10/10/60% by mass, respectively; a mixture of HFC-32/HFC-125/HFC-134a, such as 23/25/52% by mass, respectively (R407c); a mixture of HFC-321HFC-125/HFC-134a, such as 25/15/60% by mass, respectively (R407E); and a mixture of HFC-125/HFC-134a/HFC-143a, such as 44/4/52% by mass, respectively (R404A).

In certain embodiments, the at least one refrigerant is a hydrocarbon refrigerant. In certain embodiments, the hydrocarbon refrigerant is a gas at about 25° C. under 1 atm. In certain embodiments, the hydrocarbon refrigerant comprises one or more compounds selected from alkanes, cycloalkanes, and alkenes, such as those comprising 1 to 5 carbon atoms or 1 to 4 carbon atoms. In certain embodiments, the hydrocarbon refrigerant comprises one or more compounds selected from methane, ethylene, ethane, propylene, propane, cyclopropane, butane, isobutane, cyclobutane, and methylcyclopropane.

In certain embodiments, the mass ratio of the at least one estolide compound to the at least one refrigerant is about 99:1 to about 1:99. In certain embodiments, the mass ratio of the at least one estolide compound to the at least one refrigerant is about 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, or 5:95. In certain embodiments, the refrigerating fluid composition comprises from about 0 wt. % to about 80 wt. %, such as about 0 wt. % to about 60 wt. % or about 0 wt. % to about 40 wt. % of the at least one estolide compound. In certain embodiments, the at least one estolide compound is present in amounts of about 1 wt. % to about 30 wt. %, about 1 wt. % to about 25 wt. %, or about 5 wt. % to about 20 wt. %. In certain embodiments, the at least one estolide comprises about 0.5, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 30, 35, 40, 45, 50, 55, 60, 65, 70, 75, or 80 wt. % of the refrigerating fluid composition.

In certain embodiments, the refrigerating fluid further comprises at least one extreme pressure agent. In certain embodiments, the at least one extreme pressure agent is a phosphorus extreme pressure agent. In certain embodiments, the phosphorus extreme pressure agent comprises one or more compounds selected from phosphoric acid esters, acidic phosphoric acid esters, amine salts of phosphoric acid, amine salts of acidic phosphoric acid esters, amine phosphates, chlorinated phosphoric acid esters, phosphorous acid esters, phosphorylated carboxylic acid compounds, phosphorothionates, and metal salts of phosphorous-containing compounds. In certain embodiments, the at least one extreme pressure agent comprises one or more compounds selected from phosphoric acid esters, acidic phosphoric acid esters, amine salts of acidic phosphoric acid esters, chlorinated phosphoric acid esters, and phosphorous acid esters. In certain embodiments, the at least one extreme pressure agent comprises a phosphorous-containing ester prepared from phosphoric acid and/or phosphorous acid, such as those derived from alkanol or polyether-type alcohols.

Exemplary phosphoric acid esters include, but are not limited to, tripropyl phosphate, tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate, and xylyldiphenyl phosphate.

Exemplary acidic phosphoric acid esters include, but are not limited to, phosphoric acid monoalkyl esters such as monopropyl acid phosphate, monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate and monooleyl acid phosphate, and phosphoric acid dialkyl esters and phosphoric acid di(alkyl)aryl esters such as dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate and dioleyl acid phosphate.

Exemplary amine salts of acidic phosphoric acid ester include, but are not limited to, salts of the above-mentioned exemplary acidic phosphoric acid esters with amines such as methylamine, ethylamine, propylamine, butylamine, pentylamine, hexylamine, heptylamine, octylamine, dimethylamine, diethylamine, dipropylamine, dibutylamine, dipentylamine, dihexylamine, diheptylamine, dioctylamine, trimethylamine, triethylamine, tripropylamine, tributylamine, tripentylamine, trihexylamine, triheptylamine, trioctylamine.

Exemplary chlorinated acidic phosphoric acid esters include, but are not limited to, tris dichloro propyl phosphate, tris chloroethyl phosphate, tris chlorophenyl phosphate, and polyoxyalkylene bis[di(chloroalkyl)]phosphate.

Exemplary phosphorous acid esters include, but are not limited to, dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleoyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite, and tricresyl phosphite.

Exemplary phosphorous-containing carboxylic acids include, but are not limited to, compounds represented by Formula A:

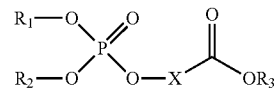

Formula A wherein X is an alkylene residue and $R_1$, $R_2$, and $R_3$ are independently selected from hydrogen, optionally substituted alkyl, optionally substituted cycloalkyl, optionally substituted cycloalkylalkyl, optionally substituted aryl, optionally substituted arylalkyl, optionally substituted heteroaryl, optionally substituted heteroarylalkyl, optionally substituted heterocycloalkyl, and optionally substituted heterocycloalkylalkyl.

Exemplary phosphorothionate compounds include, but are not limited to, compounds represented by Formula B:

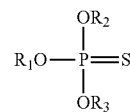

Formula B wherein $R_1$, $R_2$, and $R_3$ are independently selected from hydrogen, optionally substituted alkyl, optionally substituted cycloalkyl, optionally substituted cycloalkylalkyl, optionally substituted aryl, optionally substituted arylalkyl, optionally substituted heteroaryl, optionally substituted heteroarylalkyl, optionally substituted heterocycloalkyl, and optionally substituted heterocycloalkylalkyl.

Exemplary amine salts of phosphorous-containing compounds include, but are not limited to, alkylamine or alkanolamine salts of phosphoric acid, butylamine phosphates, propanolamine phosphates, and triethanol, monoethanol, dibutyl, dimethyl, and monoisopropanol amine phosphates.

Exemplary metal salts of phosphorous-containing compounds include, but are not limited to, metal salts of the phorphorous compounds described herein. In certain embodiments, the metal salts of phorphorous compounds are prepared by neutralizing a part or whole of the acidic hydrogen of the phosphorus compound with a metal base. Exemplary metal bases include, but are not limited to, metal oxides, metal hydroxides, metal carbonates, and metal chlorides, wherein said metal is selected from alkali metals such as lithium, sodium, potassium, and cesium, alkali-earth metals such as calcium, magnesium, and barium, and heavy metals such as zinc, copper, iron, lead, nickel, silver, and manganese.

In certain embodiments, the at least one extreme pressure agent is selected from one or more sulfur compounds. In certain embodiments, the at least one extreme pressure agent comprises one or more compounds selected from sulfides and polysulfides, such as benzyldisulfide, bis-(chlorobenzyl) disulfide, dibutyl tetrasulfide, sulfurized oils and fats, sulfurized glyceridic oils, sulfurized fatty acids, sulfurized esters, sulfurized olefins, dihydrocarbyl(poly)sulfides, thiadiazole compounds, alkylthiocarbamoyl compounds, alkylthiocarbamate compounds, thioterpene compounds, dialkyl thiodipropionate compounds, sulfurized mineral oils, zinc dithiocarbamate compounds and molybdenum dithiocarbamates, sulfurized alkylphenols, sulfurized dipentenes, sulfurized terpenes, and sulfurized Diels-Alder adducts. Other exemplary sulfur compounds include, but are not limited to, phosphosulfurized hydrocarbons, such as the reaction product of phosphorus sulfide with turpentine or methyl oleate.

Exemplary dihydrocarbyl(poly)sulfides include, but are not limited to, dibenzyl polysulfides, dinonyl polysulfides, didodecyl polysulfides, dibutyl polysulfides, dioctyl polysulfides, diphenyl polysulfides, and dicyclohexyl polysulfides. Exemplary thiadiazole compounds include, but are not limited to, 1,3,4-thiadiazoles, 1,2,4-thiadiazoles, and 1,4,5-thiadiazoles, such as 2,5-bis(n-hexyldithio)-1,3,4-thiadiazole, 2,5-bis(n-octyldithio)-1,3,4-thiadiazole, 2,5-bis(n-nonyldithio)-1,3,4-thiadiazole, 2,5-bis(1,1,3,3-tetramethylbutyldithio)-1,3,4-thiadiazole, 3,5-bis(n-hexyldithio)-1,2,4-thiadiazole, 3,5-bis(n-octyldithio)-1,2,4-thiadiazole, 3,5-bis(n-nonyldithio)-1,2,4-thiadiazole, 3,5-bis(1,1,3,3-tetramethylbutyldithio)-1,2,4-thiadiazole, 4,5-bis(n-hexyldithio)-1,2,3-thiadiazole, 4,5-bis(n-octyldithio)-1,2,3-thiadiazole, 4,5-bis(n-nonyldithio)-1,2,3-thiadiazole, and 4,5-bis(1,1,3,3-tetramethylbutyldithio)-1,2,3-thiadiazole.

Exemplary alkylthiocarbamoyl compounds include, but are not limited to, bis(dimethylthiocarbamoyl)monosulfide, bis(dibutylthiocarbamoyl)monosulfide, bis(dimethylthiocarbamoyl)disulfide, bis(dibutylthiocarbamoyl)disulfide, bis(diamylthiocarbamoyl)disulfide, and bis(dioctylthiocarbamoyl)disulfide. Exemplary alkylthiocarbamate compounds include, but are not limited to, methylene bis(dibutyldithiocarbamate) and methylene bis[di(2-ethylhexyl)dithiocarbamate]. Exemplary thioterpene compounds include, but are not limited to, reaction products of phosphorus pentasulfide and pinene. Exemplary dialkyl thiodipropionate compounds include, but are not limited to, dilauryl thiodipropionate and distearyl thiodipropionate.

In certain embodiments, the at least one extreme pressure agent is present in amounts of about 0 to about 25 wt. % of the refrigerating fluid composition. In certain embodiments, the at least one extreme pressure agent is present in amounts of about 0 to about 20, about 0 to about 15, about 0 to about 10, about 0 to about 8, about 0 to about 6, about 0 to about 4, or about 0 to about 2 wt. % of the refrigerating fluid composition. In certain embodiments, the at least one extreme pressure agent is present in amounts of about 0 to about 5 wt. % of the refrigerating fluid composition, such as about 0.1 to about 3 wt %. In certain embodiments, the at least one extreme pressure agent is present in amounts of about 1, 2, 3, 4, 5, 6, 7, 8, 9, 10, 11, 12, 13, 14, 15, 16, 17, 18, 19, or 20 wt. %. In certain embodiments, the at least one extreme pressure agent is present in amounts of about 0.2, 0.4, 0.6, 0.8, 1.0, 1.2, 1.4, 1.6, 1.8, 2.0, 2.2, 2.4, 2.6, 2.8, or 3.0 wt. %.

In certain embodiments, the refrigerating composition further comprises at least one additive selected from separation preventers, stability enhancers, biocides, surfactants, corrosion inhibitors, and antioxidants. In certain embodiments, the at least one additive is a separation preventer comprising one or more compounds selected from alcohols, amines, ethers, amides, carboxylic acids such as fatty acids, and esters such as alkyl esters of fatty acids. Exemplary alcohol separation preventers include, but are not limited to, monohydric alcohols and polyhydric alcohols. Exemplary ester separation preventers include, but are not limited to, the reaction product of a monohydric or polyhydric alcohol with a monobasic or polybasic carboxylic acid. Exemplary ether separation preventers include, but are not limited to, the reaction product of the etherification of a monohydric or polyhydric alcohol.

Exemplary monohydric alcohols include, but are not limited to, branched or unbranched and saturated or unsaturated alcohols. In certain embodiments, the monohydric alcohols may comprise 1 to 24, 1 to 18, 1 to 12, or 1 to 8 carbon atoms, such as methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, octadecanol, nonadecanol, icosanol, henicosanol, tricosanol, and tetracosanol.

In certain embodiments, the separation preventer is a polyhydric alcohol comprising one or more alcohols selected from dihydric to decahydric alcohols, such as dihydric to hexahydric. Exemplary polyhydric alcohols include, but are not limited to, ethylene glycol, diethylene glycol, polyethylene glycols (e.g., trimer to a pentadecamer of ethylene glycol), propylene glycol, dipropylene glycol, polypropylene glycols (e.g., trimer to a pentadecamer of propylene glycol), 1,3-propanediol, 1,2-propanediol, 1,3-butanediol, 1,4-butanediol, 2-methyl-1,2-propanediol, 2-methyl-1,3-propanediol, 1,2-pentanediol, 1,3-pentanediol, 1,4-pentanediol, 1,5-pentanediol and neopentyl glycol, glycerol, polyglycerols (e.g., dimer to an octamer of glycerol, for example, diglycerol, triglycerol and tetraglycerol), trimethylolalkanes (e.g., trimethylolethane, tximethylolpropane, trimethylolbutane), pentaerythritols (e.g., dimers to tetramers thereof), 1,2,4-butanetriol, 1,3,5-pentanetriol, 1,2,6-hexanetriol, 1,2,3,4-butanetetrol, sorbitol, sorbitan, sorbitol glycerol condensates, adonitol, arabitol, xylitol and mannitol, and saccharides such as xylose, arabinose, ribose, rhamnose, glucose, fructose, galactose, mannose, sorbose, cellobiose, maltose, isomaltose, trehalose and sucrose.

Exemplary carboxylic acid separation preventers include, but are not limited to, fatty acids, such as saturated or unsaturated and branched or unbranched fatty acids having 2 to 24, 2 to 18, 2 to 14, 2 to 12, or 2 to 8 carbon atoms. In certain embodiments, the carboxylic acid comprises one or more compounds selected from polybasic acids like dibasic acids, such as acyclic dibasic acids and cyclic dibasic acids. The acyclic dibasic acids may be branched or unbranched and saturated or unsaturated. Exemplary acyclic dibasic acids include, but are not limited to, those having 2 to 25 carbons, such as ethanedioic acid, propanedioic acid, butanedioic acid, pentanedioic acid, hexanedioic acid, heptanedioic acid, octanedioic acid, nonanedioic acid, decanedioic acid, undecanedioic acid, dodecanedioic acid, tridecanedioic acid, tetradecanedioic acid, heptadecanedioic acid, hexadecanedioic acid, hexenedioic acid, heptenedioic acid, octenedioic acid, nonenedioic acid, decenedioic acid, undecenedioic acid, dodecenedioic acid, tridecenedioic acid, tetradecenedioic acid, and heptadecenedioic acid. Exemplary cyclic dibasic acids include, but are not limited to, 1,2-cyclohexanedicarboxylic acid, 4-cyclohexene-1,2-dicarboxylic acid, and aromatic dicarboxylic acids.

Exemplary ether separation preventers include, but are not limited to, triphenyl octyl triether of glycerol, di(methyloxyisopropylene) dodecyl triether of trimethylolpropane, tetrahexyl ether of pentaerythritol, hexapropyl ether of sorbitol, dimethyl dioctyl tetraether of diglycerol, tetra(methyloxyisopropylene) decyl pentaether of triglycerol, hexapropyl ether of dipentaerythritol, and pentamethyl octyl hexaether of tripentaerythritol.

In certain embodiments, the amine separation preventer comprises one or more compounds selected from monoamines, polyamines, and alkanol amines, such as alkylamines, alkyl cycloalkyl amines, cycloalkylamines, aryl amines, and aromatic-substituted akylamines. Exemplary amines include, but are not limited to, monomethylamine, dimethylamine, trimethylamine, monoethylamine, diethylamine, triethylamine, monopropylamine, dipropylamine, tripropylamine, monobutylamine, dibutylamine, tributylamine, monopentylamine, dipentylamine, tripentylamine, monohexylamine, dihexylamine, monoheptylamine, diheptylamine, monooctylamine, dioctylamine, monononylamine, monodecylamine, monoundecylamine, monododecylamine, monotridecylamine, monotetradecylamine, monopentadecylamine, monohexadecylamine, monoheptadecylamine, monooctadecylamine, monononadecylamine, monoicosylamine, monohenicosylamine, monodocosylamine, monotricosylamine, dimethyl(ethyl)amine, dimethyl(propyl)amine, dimethyl(butyl)amine, dimethyl(pentyl)amine, dimethyl(hexyl)amine, dimethyl(heptyl)amine, dimethyl(octyl)amine, dimethyl(nonyl)amine, dimethyl(decyl)amine, dimethyl(undecyl)amine, dimethyl(dodecyl)amine, dimethyl(tridecyl)amine, dimethyl(tetradecyl)amine, dimethyl(pentadecyl)amine, dimethyl(hexadecyl)amine, dimethyl(heptadecyl)amine, dimethyl(octadecyl)amine, dimethyl(nonadecyl)amine, dimethyl(icosyl)amine, dimethyl(henicosyl)amine, dimethyl(tricosyl)amine; monovinylamine, divinylamine, trivinylamine, monopropenylamine, dipropenylamine, tripropenylamine, monobutenylamine, dibutenylamine, tributenyl amine, monopentenylamine, dipentenyl amine, tripentenylamine, monohexenylamine, dihexenylamine, monoheptenylamine, diheptenylamine, monooctenylamine, dioctenylamine, monononenylamine, monodecenylamine, monoundecenylamine, monododecenylamine, monotridecenylamine, monotetradecenylamine, monopentadecenylamine, monohexadecenylamine, monoheptadecenylamine, monooctadecenylamine, monononadecenylamine, monoicosenylamine, monohenicosenylamine, monodocosenylamine and monotricosenylamine, dimethyl(vinyl)amine, dimethyl(propenyl)amine, dimethyl(butenyl)amine, dimethyl(pentenyl)amine, dimethyl(hexenyl)amine, dimethyl(heptenyl)amine, dimethyl(octenyl)amine, dimethyl(nonenyl)amine, dimethyl(decenyl)amine, dimethyl(undecenyl)amine, dimethyl(dodecenyl)amine, dimethyl(tridecenyl)amine, dimethyl(tetradecenyl)amine, dimethyl(pentadecenyl)amine, dimethyl(hexadecenyl)amine, dimethyl(heptadecenyl)amine, dimethyl(octadecenyl)amine, dimethyl(nonadecenyl)amine, dimethyl(icosenyl)amine, dimethyl(henicosenyl)amine and dimethyl(tricosenyl)amine, monobenzylamine, (1-phenylethyl)amine, (2-phenylethyl)amine (aka: monophenethylamine), dibenzylamine, bis(1-phenylethyl)amine and bis(2-phenylethylene)amine (aka: diphenethylamine), monocyclopentylamine, dicyclopentylamine, tricyclopentylamine, monocyclohexylamine, dicyclohexylamine, monocycloheptylamine, dicycloheptylamine, dimethyl(cyclopentyl)amine, dimethyl(cyclohexyl)amine, dimethyl(cycloheptyl)amine, (methylcyclopentyl)amine, bis(methylcyclopentyl)amine, (dimethylcyclopentyl)amine, bis(dimethylcyclopentyl)amine, (ethylcyclopentyl)amine, bis(ethylcyclopentyl)amine, (methylethylcyclopentyl)amine, bis(methylethylcyclopentyl)amine, (diethylcyclopentyl)amine, (methylcyclohexyl)amine, bis(methylcyclohexyl)amine, (dimethylcyclohexyl)amine, bis(dimethylcyclohexyl)amine, (ethylcyclohexyl)amine, bis(ethylcyclohexyl)amine, (methylethylcyclohexyl)amine, (diethylcyclohexyl)amine, (methylcycloheptyl)amine, bis(methylcycloheptyl)amine, (dimethylcycloheptyl)amine, (ethylcycloheptyl)amine, (methylethylcycloheptyl)amine, and (diethylcycloheptyl)amine. In certain embodiments, the alkanol amine comprises one or more compounds selected from $C_1$-$C_4$ alkanolamines, and primary, secondary and tertiary alkanol amines. Exemplary alkanol amines include, but are not limited to, mono-, di- and triethanolamine (TEA), and mono-, di- and tri-isopropanolamine.

In certain embodiments, the amide separation preventer comprises at least one compound derived from the reaction product of a carboxylic acid with a nitrogen-containing compound such as monoamines and diamines. Suitable carboxylic acids include those previously described herein, such as fatty acids. Exemplary amide separation inhibitors include, but are not limited to, lauric acid amide, lauric acid diethanolamide, lauric acid monopropanolamide, myristic acid amide, myristic acid diethanolamide, myristic acid monopropanolamide, palmitic acid amide, palmitic acid diethanolamide, palmitic acid monopropanolamide, stearic acid amide, stearic acid diethanolamide, stearic acid monopropanolamide, oleic acid amide, oleic acid diethanolamide, oleic acid monopropanolamide, coconut oil fatty acid amide, coconut oil fatty acid diethanolamide, and coconut oil fatty acid monopropanolamide.

Exemplary stability enhancers include, but are not limited to, epoxy compounds such as phenylglycidyl ether-type epoxy compounds (e.g., n-butylphenyl glycidyl ether), alkyl glycidyl ether-type epoxy compounds (e.g., decyl glycidyl ether), glycidyl ester-type epoxy compounds (e.g., glycidyl-2,2-dimethyl octanoate), allyl oxirane compounds (e.g., 1,2-epoxy styrene), alkyl oxirane compounds (e.g., 1,2-epoxypentane), cycloaliphatic epoxy compounds (e.g., 1,2-epoxycyclopentane), epoxidized fatty acid monoesters (e.g., hexyl epoxystearate), and epoxidized vegetable oils.

In certain embodiments, the biocide comprises one or more compounds selected from antifugal, antimicrobial, and antibacterial agents. Exemplary biocides include, but are not limited to, morpholine-based compounds such as 4-(2-nitrobutyl) morpholine, 4,4'-(2-ethyl-2-nitrotrimethylene)dimorpholine and methylene dimorpholine, which may be commercially available under the designations Bioban P-1487™, Bioban CS-1135™, and Kaython™ EDC 1.5 (marketed by Dow Chemical Co.). Other exemplary biocides include, but are not limited to, those comprising the material poly(oxy-1,2-ethanediyl(dimethylimino)-1,2-ethanediyl (dimethylimino)-1,2-ethanediyl dichloride, sold under the designation Busan® 77 (marketed by Buckman Laboratories, Inc. of Memphis, Tenn.).

In certain embodiments, the surfactant will aid in the stability and compatibility of all the ingredients. In certain embodiments, the surfactant comprises one or more compounds selected from polyols and ether and esters thereof, such as glycols, polyglycols, polyalkylene glycols (PAGs), polyalkylene glycol esters, and copolymers thereof. Exemplary PAGs include, but are not limited to, polyethylene glycols (PEGs) and variants thereof, such as PEG-6 laurate, PEG-8 oleate, PEG-6 stearate, PEG-10 stearate, PEG-12 stearate, PEG-8 myristate, PEG-36 castor oil, PEG-40 castor oil, PEG-8 tallate, PEG-20 tallate, PEG-14 cocoate, PEG-20 sorbitan laurate, PEG-20 sorbitan monopalmitate, PEG-20 sorbitan stearate, PEG-20 sorbitan oleate, PEG-20 sorbitan trioleate, PEG-20 sorbitan tristerate, PEG-32, PEG-55, meroxapol 254, poloxamer 335, PEG-4, PEG-6, PEG-12, PEG-8 lauryl ether, PEG-10 lauryl ether, PEG-12 cetyl ether, PEG-10 oleyl ether, PEG-10 myristyl ether, PEG-10 coconut alcohol PEG-7 nonyl phenyl ether, PEG-10 nonyl phenyl ether, PEG-9 octyl phenyl ether, PEG-16 octyl phenyl ether, and PEG-9 dodecyl phenyl ether. Exemplary polyol esters include, but are not limited to, glyceryl esters and sorbitan esters, such as glyceryl monooleate and sorbitan monooleate.

In certain embodiments, the corrosion inhibitor comprises one or more compounds selected from fatty acids, amines, alkylamines, alkanolamines, alkylamides, alkanolamides, and azole-type compounds such as triazoles and thiazoles.

Exemplary corrosion inhibitors include, but are not limited to, benzothiazoles, benzotriazoles, thiadiazoles, imidazoles, and tolutriazoles, including the sodium salt of mercaptobenzotriazole, naphthotriazole, methylene bis-benzotriazole, dodecyltriazole, and butylbenzotriazole.

In certain embodiments, the antioxidant comprises one or more compounds selected from phenolic antioxidants, amine antioxidants, and organometallic antioxidants. Exemplary amine antioxidants include, but are not limited to, phenyl-α-naphthylamine compounds, dialkyldiphenylamine compounds, benzylamine compounds, and polyamine compounds. Exemplary phenolic antioxidants include, but are not limited to, hindered phenolic antioxidants such as 3,5-di-t-butyl 4-hydroxy phenol propionate (e.g., Irganox L135® marketed by Ciba Specialty Chemicals of Tarrytown, N.Y.) and 2-(4-hydroxy-3,5-di-t-butyl benzyl thiol) acetate (e.g., Irganox L118® marketed by Ciba Specialty Chemicals of Tarrytown, N.Y.). Other exemplary antioxidants include, but are not limited to, butylated hydroxy toluene (BHT), butylated hydroxy anisole (BHA), and mono-tertiary butyl hydro quinone (TBHQ).

Other optional additives include, but are not limited to, abrasion inhibitors, viscosity index improvers, pour-point depressants, detergent-dispersants, and antifoaming agents.

In certain embodiments, the refrigerating fluid sufficiently satisfies certain desirable performance characteristics such as lubricity, refrigerant compatibility, low temperature fluidity and stability in a good balance. In certain embodiments, the refrigerating fluid is suitable for refrigerators or heat pumps with a reciprocal or rotary open type, semi-hermetic type, or hermetic type compressor. In certain embodiments, when used in a refrigerator with a lead containing bearing, the refrigerating fluid may achieve suppression of elution of the lead from the lead-containing bearing, as well as heat/chemical stability. In certain embodiments, the refrigerating fluid is suitable for use in automotive air conditioners, dehumidifiers, residential and commercial refrigeration and air conditioning, freezer/cold storage units and warehouses, and vending machines. In certain embodiments, the refrigerating fluid is suitable for use in compressors, such as reciprocal compressors, rotary compressors, and centrifuging compressors.

In certain embodiments, the composition comprising the at least one estolide compound is a compressor fluid. In certain embodiments, the compressor fluid is useful as a compressor oil composition for high-temperature applications. In certain embodiments, the compressor fluid is suitable for use in rotary gas compressors and gas turbines for electricity generation. In certain embodiments, the compressor fluid comprises at least one estolide compound selected from Formulas I, II, and III. In certain embodiments, the compressor fluid further comprises at least one mist suppressant.

In certain embodiments, the mass ratio of the at least one estolide compound to the mist suppressant is about 99:1 to about 1:99. In certain embodiments, the mass ratio of the at least one estolide compound to the at least one mist suppressant is about 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, or 5:95.

In certain embodiments, the at least one mist suppressant comprises one or more compounds selected from polymeric materials that include, but are not limited to, polyalkylene oxides (e.g., Polyox® marketed by Union Carbide), polyolefins, polyacrylates, polymethacrylates, polyacrylamides, polymethacrylamides, polystyrenes, and polymethylstyrenes, and polymers and copolymers of two or more monomers selected from acrylamides, methyl acrylamides, acrylates, methacrylates, styrenes, methylstyrenes, olefins (e.g., ethylene, propylene, isobutylene), vinyl acetate, and unsaturated organic carboxylic acids (e.g., monounsaturated fatty acids). In certain embodiments, the acrylate and methacrylate monomers are selected from alkyl acrylates, alkylamino acrylates, alkyl methacrylates, and alkylamino methacrylates. In certain embodiments, the polymeric material comprises an average molecular weight of about 500-1,000,000 atomic mass units (amu), such as about 70,000 to about 350,000, or about 100,000 to about 250,000.

In certain embodiments, the desired molecular weight and compatibility of the at least one mist suppressant is determined by an ability to reduce by 50 wt. % or more of misted (suspended) base oil droplets as compared to a control of the same oil sheared under the same conditions in the absence of the polymeric material. In certain embodiments, the at least one mist suppressant is present in amounts of about 0 to about 30 wt. % of the refrigerating fluid composition. In certain embodiments, the at least one mist suppressant is present in amounts of about 0 to about 20, about 0 to about 15, about 0 to about 10, about 0 to about 8, about 0 to about 6, about 0 to about 4, or about 0 to about 2 wt. % of the compressor fluid composition. In certain embodiments, the at least one mist suppressant is present in amounts of about 0 to about 5 wt. % of the compressor fluid composition, such as about 0.1 to about 3 wt % or 0.01 to about 1 wt. %. In certain embodiments, the at least one mist suppressant is present in amounts of about 0.2, 0.4, 0.6, 0.8, 1.0, 1.2, 1.4, 1.6, 1.8, 2.0, 2.2, 2.4, 2.6, 2.8, or 3.0 wt. %. In certain embodiments, the at least one mist suppressant is present in amounts of about 0.01, 0.02, 0.03, 0.04, 0.05, 0.06, 0.07, 0.08, 0.09, or 0.1 wt. %.

In certain embodiments, the compressor fluid further comprises at least one additive comprising one or more compounds selected from separation preventers, stability enhancers, biocides, surfactants, corrosion inhibitors, and antioxidants, such as those previously described herein. Other optional additives include, but are not limited to, abrasion inhibitors, viscosity index improvers, pour-point depressants, detergent-dispersants, and antifoaming agents.

In certain embodiments, the composition comprising the at least one estolide compound is a hydraulic fluid. In certain embodiments, the hydraulic fluid may be suitable for use in any of the applications known to those of skill in the art including, but not limited to, heavy machinery and machine tools, construction equipment, metal-making equipment, and other industrial processes. In certain embodiments, the hydraulic fluid comprises at least one estolide compound selected from Formulas I, II, and III. In certain embodiments, the hydraulic fluid further comprises at least one extreme pressure agent. In certain embodiments, the at least one extreme pressure agent comprises one or more compounds selected from phosphorous compounds and sulfur compounds. In certain embodiments, the mass ratio of the at least one estolide compound to the at least one extreme pressure agent is about 99:1 to about 1:99. In certain embodiments, the mass ratio of the at least one estolide compound to the at least one extreme pressure agent is about 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, or 5:95.

In certain embodiments, the at least one extreme pressure agent comprises one or more of the phosphorous compounds previously described herein. In certain embodiments, the at least one extreme pressure agent comprises one or more of the sulfur compounds previously described herein.

In certain embodiments, the at least one extreme pressure agent is present in amounts of about 0 to about 30 wt. % of the hydraulic fluid composition. In certain embodiments, the at least one extreme pressure agent is present in amounts of about 0 to about 20, about 0 to about 15, about 0 to about 10, about 0 to about 8, about 0 to about 6, about 0 to about 4, or about 0 to about 2 wt. % of the hydraulic fluid composition. In certain embodiments, the at least one extreme pressure agent is present in amounts of about 0 to about 5 wt. % of the hydraulic fluid composition, such as about 0.1 to about 3 wt % or 0.01 to about 1 wt. %. In certain embodiments, the at least one extreme pressure agent is present in amounts of about 0.2, 0.4, 0.6, 0.8, 1.0, 1.2, 1.4, 1.6, 1.8, 2.0, 2.2, 2.4, 2.6, 2.8, or 3.0 wt. %. In certain embodiments, the at least one extreme pressure agent is present in amounts of about 0.01, 0.02, 0.03, 0.04, 0.05, 0.06, 0.07, 0.08, 0.09, or 0.1 wt. %.

In certain embodiments, the hydraulic fluid further comprises at least one additive selected from one or more of the separation preventers, stability enhancers, biocides, surfactants, corrosion inhibitors, and antioxidants previously described herein. Other optional additives include, but are not limited to, abrasion inhibitors, viscosity index improvers, pour-point depressants, detergent-dispersants, and antifoaming agents.

In certain embodiments, the composition comprising the at least one estolide compound is a metalworking fluid. In certain embodiments, the metalworking fluid may be suitable for use in various metalworking processes including, but not limited to, drawing processes, ironing processes, press working processes, forging processes (e.g., hot forging), cutting/grinding processes, and rolling processes (e.g., hot rolling and cold rolling). In certain embodiments, the metalworking fluids described herein are suitable for the processing of iron, stainless steel, aluminum and alloys thereof, nickel and alloys thereof, chromium and alloys thereof, copper and alloys thereof, zinc and alloys thereof, and titanium and alloys thereof.

In certain embodiments, the metalworking fluid comprises at least one estolide compound selected from Formulas I, II, and III. In certain embodiments, the metalworking fluid further comprises at least one extreme pressure agent. In certain embodiments, the mass ratio of the at least one estolide compound to the at least one extreme pressure agent is about 99:1 to about 1:99. In certain embodiments, the mass ratio of the at least one estolide compound to the at least one extreme pressure agent is about 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, or 5:95.

In certain embodiments, the at least one extreme pressure agent of the metalworking fluid comprises one or more compounds selected from any of the extreme pressure agents previously described herein. In certain embodiments, the at least one extreme pressure agent is a phosphorous extreme pressure agent. In certain embodiments, the at least one extreme pressure agent comprises one or more compounds selected from amine salts of phosphoric acid and amine phosphates.

In certain embodiments, the at least one extreme pressure agent is present in amounts of about 0 to about 30 wt. % of the metalworking fluid composition. In certain embodiments, the at least one extreme pressure agent is present in amounts of about 0 to about 20, about 0 to about 15, about 0 to about 10, about 0 to about 8, about 0 to about 6, about 0 to about 4, or about 0 to about 2 wt. % of the metalworking fluid composition. In certain embodiments, the at least one extreme pressure agent is present in amounts of about 0.1 to about 15 wt. % of the metalworking fluid composition, such as about 1 to about 10 wt. % or 2 to about 8 wt. %. In certain embodiments, the at least one extreme pressure agent is present in amounts of about 1, 2, 3, 4, 5, 6, 7, 8, 9, 10, 11, 12, 13, 14, 15, 16, 17, 18, 19 or 20 wt. %. In certain embodiments, the at least one extreme pressure agent is present in amounts of about 1, 1.5, 2, 2.5, 2, 3.5, 4, 4.5, 5, 5.5, 6, 6.5, 7, 7.5, 8, 8.5, 9, 9.5, or 10 wt. %.

In certain embodiments, the metalworking fluid further comprises at least one surfactant, which may comprise one or more of the surfactants previously described herein. In certain embodiments, the metalworking fluid further comprises at least one biocide, which may comprise one or more of the biocides previously described herein. In certain embodiments, the metalworking fluid further comprises at least one corrosion inhibitor, which may comprise one or more of the corrosion inhibitors previously described herein.

In certain embodiments, the metalworking fluid further comprises at least one additive comprising one or more compound selected from separation preventers, stability enhancers, and antioxidants previously described herein. Other optional additives include, but are not limited to, abrasion inhibitors, viscosity index improvers, pour-point depressants, detergent-dispersants, and antifoaming agents.

In certain embodiments, the metalworking fluid comprises a water-soluble composition. In certain embodiments, the metalworking fluid comprises an aqueous composition. Accordingly, in certain embodiments, the metalworking fluid further comprises water.

In certain embodiments, the composition comprising the at least one estolide compound is a food-grade lubricant. In certain embodiments, the food-grade lubricant is formulated for use in equipment in the food service industry, such as general-purpose equipment lubricants, chain lubricants, cable lubricants, spindle lubricants, and gear lubricants. In certain embodiments, the food-grade lubricant comprises at least one estolide compound selected from Formulas I, II, and III. In certain embodiments, the food-grade lubricant further comprises at least one polyalphaolefin (PAO). In certain embodiments, the mass ratio of the at least one estolide compound to the at least one PAO is about 99:1 to about 1:99. In certain embodiments, the mass ratio of the at least one estolide compound to the at least one PAO is about 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, or 5:95.

In certain embodiments, the at least one PAO comprises one or more compounds selected from PAO2, PAO4, PAO6, PAO8, PAO9, PAO10, PAO40, and PAO100. In certain embodiments, the at least one PAO is present in amounts of about 0 to about 95 wt. % of the food-grade lubricant. In certain embodiments, the at least one PAO is present in amounts of about 0 to about 90, about 0 to about 80, about 0 to about 70, about 0 to about 60, about 0 to about 50, about 0 to about 40, or about 0 to about 30 wt. % of the food-grade lubricant. In certain embodiments, the at least one PAO is present in amounts of about 30 to about 70 wt. % of the food-grade lubricant, such as about 40 to about 60 wt % or about 45 to about 55 wt. %. In certain embodiments, the at least one PAO is present in amounts of about 1, 5, 10, 15, 20, 25, 30, 35, 40, 45, 50, 55, 60, 65, 70, 75, 80, 85, 90, 95 or 100 wt. %. In certain embodiments, the at least one PAO is present in amounts of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt. %. In certain embodiments, the food-grade lubricant further comprises at least one antioxidant, which may comprise one or more of the antioxidants previously described herein.

In certain embodiments, the food-grade lubricant further comprises at least one additive selected from the separation preventers, stability enhancers, surfactants, biocides, and corrosion inhibitors previously described herein. Other optional additives include, but are not limited to, abrasion inhibitors, viscosity index improvers, pour-point depressants, detergent-dispersants, and antifoaming agents.

In certain embodiments, the composition comprising the at least one estolide compound is a 4-stroke lubricant composition. In certain embodiments, the 4-stroke lubricant composition is suitable for use in 4-stroke engines, such as 4-stroke marine engines. Exemplary 4-stroke marine engines include, but are not limited to, slow, fast and semi-fast 4-stroke marine engines, such as marine diesel engines. In certain embodiments, the 4-stroke lubricant composition may be used in marine diesel engines as a cylinder lubricant. In certain embodiments, the 4-stoke lubricant composition may be used as a lubricant in 4-stroke engines including, but not limited to, outboard and inboard boats and personal watercraft, automobiles, motorcycles, dirt bikes and other all-terrain vehicles.

In certain embodiments, the 4-stroke lubricant composition comprises at least one estolide compound selected from Formulas I, II, and III. In certain embodiments, the 4-stroke lubricant composition further comprises at least one detergent. Exemplary detergents may include, but are not limited to, metal salts of sulfonic acids, alkylphenols, sulfurized alkylphenols, alkyl salicylates, naphthenates and other oil soluble mono- and dicarboxylic acid. Neutral or highly basic metal salts such as highly basic alkaline earth metal sulfonates (such as calcium and magnesium salts) may be used as such detergents. Nonylphenol sulfide may also be suitable. Exemplary alkylphenol sulfides may be prepared by reacting an alkylphenol with commercial sulfur dichlorides. Exemplary alkylphenol sulfides can also be prepared by reacting alkylphenols with elemental sulfur. Other suitable detergents may include, but are not limited to, neutral and basic salts of phenols, generally known as phenates. In certain embodiments, the phenate comprises an alkyl substituted phenolic group, wherein the substituent comprises an aliphatic hydrocarbon group having about 4 to 400 carbon atoms. In certain embodiments, the detergent comprises "S911" sold by Infineum USA of Linden, N.J. In some embodiments, the 4-stroke lubricant composition comprises from about 0 wt. % to about 25 wt. % of the at least one detergent, such as about 0 wt. % to about 20 wt. %, about 1 wt. % to about 15 wt. %, or about 1 wt. % to about 10 wt. %. In certain embodiments, the at least one detergent is present in amounts of about 0.5, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, or 25 wt. % of the 4-stroke lubricant composition.

In certain embodiments, the 4-stroke lubricant further comprises at least one viscosity modifier. In certain embodiments, the at least one viscosity modifier provides high and low temperature operability to the lubricating oil and permits it to remain shear stable at elevated temperatures, while providing acceptable viscosity or fluidity at low temperatures. In certain embodiments, the at least one viscosity modifier comprises one or more compounds selected from high molecular weight hydrocarbon polymers, such as polyesters. In certain embodiments, the at least one viscosity modifier is derivatized to include other properties or functions, such as the addition of dispersancy properties. Exemplary viscosity modifiers include, but are not limited to, polybutene, polyisobutylene (PIB), copolymers of ethylene and propylene, polymethacrylates, methacrylate copolymers, copolymers of an unsaturated dicarboxylic acid and vinyl compound, interpolymers of styrene and acrylic esters, and partially hydrogenated copolymers of styrene/isoprene, styrene/butadiene, and isoprene/butadiene, as well as the partially hydrogenated homopolymers of butadiene and isoprene.

In certain embodiments, the 4-stroke lubricant comprises at least one polybutene polymer. In certain embodiments, the at least one polybutene polymer comprises a mixture of poly-n-butenes and polyisobutylene, which may result from the polymerization of $C_4$ olefins and generally will have a number average molecular weight of about 300 to 1500, or a polyisobutylene or polybutene having a number average molecular weight of about 400 to 1300. In certain embodiments, the polybutene and/or polyisobutylene may have a number average molecular weight (MW) of about 950. MW may be measured by gel permeation chromatography. Polymers composed of 100% polyisobutylene or 100% poly-n-butene should be understood to fall within the scope of this disclosure and within the meaning of the term "a polybutene polymer". An exemplary polyisobutylene includes "PIB S1054" which has an MW of about 950 and is sold by Infineum USA of Linden, N.J.

In certain embodiments, the at least one polybutene polymer comprises a mixture of polybutenes and polyisobutylene prepared from a $C_4$ olefin refinery stream containing about 6 wt. % to about 50 wt. % isobutylene with the balance a mixture of butene (cis- and trans-) isobutylene and less than 1 wt %. butadiene. For example, the at least one polybutene polymer may be prepared via Lewis acid catalysis from a $C_4$ stream composed of 6-45 wt. % isobutylene, 25-35 wt. % saturated butenes and 15-50 wt. % 1- and 2-butenes. In certain embodiments, the 4-stroke lubricant composition comprises from about 0 wt. % to about 80 wt. %, such as about 0 wt. % to about 60 wt. % or about 0 wt. % to about 40 wt. % of the at least one polybutene polymer. In certain embodiments, the at least one polybutene polymer is present in amounts of about 1 wt. % to about 30 wt. %, about 1 wt. % to about 25 wt. %, or about 5 wt. % to about 20 wt. %. In certain embodiments, the at least one polybutene polymer comprises about 0.5, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 30, 35, 40, 45, 50, 55, 60, 65, 70, 75, or 80 wt. % of the 4-stroke lubricant composition.

In certain embodiments, the 4-stroke lubricant composition further comprises at least one antioxidant. In certain embodiments, the at least one antioxidant of the 4-stroke lubricant composition comprises one or more compounds selected from the surfactants previously described herein. In certain embodiments, the 4-stroke lubricant composition further comprises at least one additive selected from one or more of the separation preventers, stability enhancers, surfactants, biocides, and corrosion inhibitors previously described herein. Other optional additives include, but are not limited to, abrasion inhibitors, viscosity index improvers, pour-point depressants, detergent-dispersants, and antifoaming agents.

In certain embodiments, the composition comprising the at least one estolide compound is a plasticized composition. In certain embodiments, the plasticized composition further comprises at least one polymeric material. In certain embodiments, the plasticized composition may comprise a solid, semi-solid, or liquid composition. In certain embodiments, the plasticized composition may be referred to as a plastisol. In certain embodiments, the plastisol comprises a polymeric material (e.g., non-crosslinked organic polymer) and a liquid phase (e.g., estolide and/or a diluent).

As used herein, the term "polymeric material" means any synthetic or naturally-occurring polymeric material, including copolymers and homopolymers. In certain embodiments, the at least one polymeric material comprises one or more compounds selected from polyvinyl polymers, polyolefins, acrylate polymers, methacrylate polymers, styrene polymers, polyesters, polyamides, polycarbonates, polyurethanes, polysulfides, silicones, elastomers, and rubbers. In certain embodiments, the mass ratio of the at least one estolide compound to the at least one polymeric material is about 99:1 to about 1:99. In certain embodiments, the mass ratio of the at least one estolide compound to the at least one polymeric material is about 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, or 5:95. In certain embodiments, the plasticized composition comprises from about 0 wt. % to about 95 wt. %, such as about 1 wt. % to about 80 wt. %, about 1 wt. % to about 70 wt. % or about 1 wt. % to about 50 wt. % of the at least one polymeric material. In certain embodiments, the at least one polymeric material is present in amounts of about 1 wt. % to about 30 wt. %, about 1 wt. % to about 25 wt. %, or about 0.1 wt. % to about 20 wt. %. In certain embodiments, the at least one polymeric material comprises about 0.5, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 21, 22, 23, 24, 25, 30, 35, 40, 45, 50, 55, 60, 65, 70, 75, or 80 wt. % of the plasticized composition.

As used herein, polymeric materials may comprise homopolymers or copolymers. Accordingly, unless indicated otherwise, it should be understood that reference to a polymer such as polyethylene includes, but is not limited to, a polyethylene homopolymer and a copolymer comprising ethylene monomers and at least one non-ethylene monomer (e.g., vinyl acetate). Exemplary polymeric materials include, but are not limited to, polyvinyl chlorides (PVC), polyethylenes, polypropylenes, polybutylenes, poly(ester amide), polystyrene-polyisobutylene-polystyrene block copolymer (SIS), polystyrene, polyisobutylene, polycaprolactone (PCL), poly(L-lactide), poly(D,L-lactide), polylactic acid (PLA), poly(lactide-co-glycolide), poly(glycolide), polyalkylene, polyfluoroalkylene, polyhydroxyalkanoate, poly (3-hydroxybutyrate), poly(4-hydroxybutyrate), poly(3-hydroxyvalerate), poly(3-hydroxybutyrate-co-3-hydroxyvalerate), poly(3-hydroxyhexanoate), poly(4-hydroxyhexanoate), mid-chain polyhydroxyalkanoate, poly (trimethylene carbonate), poly(orthoester), polyphosphazenes, poly(phosphoester), poly(tyrosine derived arylates), poly(tyrosine derived carbonates), polydimethyloxanone (PDMS), polyvinylidene fluoride (PVDF), polyhexafluoropropylene (HFP), polydimethylsiloxane, poly(vinylidene fluoride-co-hexafluoropropylene) (PVDF-HFP), poly(vinylidene fluoride-co-chlorotrifluoroethylene) (PVDF-CTFE), poly(butyl methacrylate), poly(methyl methacrylate), poly(methacrylates), poly(vinyl acetate), poly(ethylene-co-vinyl acetate), poly(ethylene-co-vinyl alcohol), poly(ester urethanes), poly(ether-urethanes), poly (carbonate-urethanes), poly(silicone-urethanes), poly(2-hydroxyethyl methacrylate), Solef™ PVDF (polyvinylidene fluoride), poly(urea-urethanes), hydroxyethyl methacrylate (HEMA), hydroxypropyl methacrylate (HPMA), hydroxypropylmethacrylamide, alkoxymethacrylate, alkoxyacrylate, 3-trimethylsilylpropyl methacrylate (TMSPMA), poly(m-ethyl methacrylate) (PMMA), poly(ethylene glycol) (PEG), polypropylene glycol) (PPG), PEG acrylate (PEGA), PEG methacrylate, methacrylic acid (MA), ethylene-vinyl acetate, acrylic acid (AA), SIS-PEG, polystyrene-PEG, polyisobutylene-PEG, PCL-PEG, PLA-PEG, PMMA-PEG, PDMS-PEG, PVDF-PEG, poly(tetramethylene glycol), polyhydroxyalkanoates (PHAs), poly(ester amides), polycaprolactones, poly(L-lactide), poly(D,L-lactide), poly(D,L-lactide-co-PEG) block copolymers, poly(D,L-lactide-co-trimethylene carbonate), polyglycolides, poly(lactide-co-glycolide), polydioxanones, polyorthoesters, polyanhydrides, poly(glycolic acid-co-trimethylene carbonate), polyphosphoesters, polyphosphoester urethanes, poly (amino acids), polycyanoacrylates, poly(trimethylene carbonate), poly(imino carbonate), polycarbonates, polyurethanes, copoly(ether-esters) (e.g., PEO/PLA), polyalkylene oxalates, polyphosphazenes, PHA-PEG, poly(alpha-hydroxyacids), poly(beta-hydroxyacids) such as poly(3-hydroxybutyrate) (PHB), poly(3-hydroxybutyrate-co-valerate) (PHBV), poly(3-hydroxypropionate) (PHP), poly (3-hydroxyhexanoate) (PHH), a poly(4-hydroxyacid) such as poly(4-hydroxybutyrate), poly(4-hydroxyvalerate), or poly(4-hydroxyhexanoate), poly(hydroxyvalerate), polyanhydrides, poly(hydroxyethyl methacylate), poly(N-acylhydroxyproline)esters, poly(N-palmitoyl hydroxyproline)esters, polyphosphazenes, poly(tyrosine carbonates), and poly (tyrosine arylates).

In certain embodiments, the at least one polymeric material is biodegradable. In certain embodiments, the biodegradable polymeric material comprises one or more materials selected from biodegradable polyesters and biodegradable polyethylenes. Exemplary biodegradable polyesters include, but are not limited to, polyglycolic acid, polylactic acid, polycaprolactone, polyhydroxybutyrate, polyhydroxyvalerate, and polyhydroxyvaleric acid. Exemplary biodegradable polyethylenes include, but are not limited to, polyvinylacetate, poly(butylenes succinate), polyvinyl alcohol, and poly-p-dioxanone.

Exemplary elastomers and rubbers include, but are not limited to, natural rubber (NR), isoprene rubber (IR), butadiene rubber (BR), 1,2-butadiene rubber, styrene-butadiene rubber (SBR), acrylonitrile-butadiene rubber (NBR), chloroprene rubber (CR), butyl rubber (BR), ethylene-propylene-diene rubber (EPDM) and other diene rubbers and their hydrogenated products, ethylene-propylene rubber (EPM), ethylene-acrylic rubber (AEM), ethylene-butene rubber (EBM), chlorosulfonated polyethylene, acrylic rubber, fluororubber, polyethylene rubber, polypropylene rubber, and other olefin rubbers, epichlorohydrin rubbers, polysulfide rubbers, silicone rubbers, and urethane rubbers. In certain embodiments, the elastomer may comprise a resin component. Exemplary elastomers may include optionally hydrogenated polystyrene elastomeric polymers (e.g., styrene-butadiene-styrene (SBS), styrene-isoprene-styrene (SIS), and styrene-ethylene/butylene-styrene (SEBS)), polyolefin elastomeric polymers, polyvinyl chloride elastomeric polymers, polyurethane elastomeric polymers, polyester elastomeric polymers, and polyamide elastomeric polymers.

In certain embodiments, the plasticized composition further comprises at least one thermal stabilizer. In certain embodiments, the at least one thermal stabilizer comprises one or more compounds selected from epoxy compounds, metallic stabilizers, phosphites, nitrogen-containing stabilizers, polyols, hydrotalcites, zeolites, and dawsonites.

Exemplary epoxy thermal stabilizers include, but are not limited to, epoxidized oils such as soybean oil, lard oil, olive oil, linseed oil, peanut oil, castor oil, corn oil, tung oil, and cottonseed oil. Other exemplary epoxy thermal stabilizers may include, but are not limited to, epichlorhydrin/bisphenol A resins, butoxypropylene oxide, glycidyl epoxystearate, epoxidized alpha-olefins, epoxidized glycidyl soyate, epoxidized butyl toluate, glycidol, vinyl cyclo-hexene dioxide, glycidyl ethers of resorcinol, hydroquinone, 1,5-dihydroxynaphthalene-, glycerine, pentaerythritol, and sorbitol, allyl glycidyl ether, butyl glycidyl ether, cyclohexane oxide, 4-(2,3-epoxyproproxy)acetophenone, mesityl oxide epoxide, and 2-ethyl-3-propyl glycidamine.

Exemplary phosphite thermal stabilizers include, but are not limited to, trialkylphosphites such as trioctyl phosphite, tridecyl phosphite, tridodecyl phosphite, tri(tetradecyl)phosphite, tricyclohexyl phosphite, tristearyl phosphite, distearyl-pentaerythritol diphosphite, and trioleyl phosphite; triaryl phosphites such as triphenyl phosphite, tricresyl phosphite, and tris-p-nonylphenyl phosphite, alkyldiaryl phosphites such as phenyididecyl phosphite and (2,4-di-tert-butylphenyl)didodecyl phosphite, dialkylaryl phosphites, and thiophosphites such as trithiohexyl phosphite, trithiooctyl phosphite, trithiolauryl phosphite, and trithiobenzyl phosphite.

Exemplary metallic thermal stabilizers include, but are not limited to, metal salts and organometallic salts, such as oxides, hydroxides, sulfides, sulfates, halides, phosphates, phenates, perchlorates, carboxylates, and carbonates of metals like zinc, barium, strontium, calcium, tin, magnesium, cobalt, nickel, titanium, antimony, and aluminum, such as calcium hydroxide, magnesium hydroxide, calcium stearate, calcium 2-ethylhexanoate, calcium octanoate, calcium recinoaleate, calcium myristate, calcium palmitate, barium laurate, barium di(nonylphenolate), barium stearate, aluminum stearate, and hydrotalcite. Exemplary organometallic thermal stabilizers also include, but are not limited to, organotin carboxylates and mercaptides, such as butyltin tris dodecyl mercaptide, dibutytin dilaurate, dibutyltin didodecyl mercaptide, dianhydride tris dibutylstannane diol, dihydrocarbontin salts of carboxy mercaptals, monosulfides and/or polysulfides of the organotin mercaptides of mercaptoalkyl carboxylates and/or alkyl thioglycolates.

Exemplary nitrogen-containing thermal stabilizers include, but are not limited to, dicyandiamide, hindered amines, melamine, urea, dimethyl hydantoin, guanidine, thiourea, 2-phenylindoles, aminocrontonates, N-alkyl and N-phenyl substituted maleimides, 1,3-dialkyl-6-amino-uracil derivatives, pyrrolodiazine diones, and monomeric, oligomeric, and polymeric 2,2,6,6-tetramethylpiperidine compounds. Other exemplary nonmetallic stabilizers include, but are not limited to, dilaurylthiodipropionate, distearyl 3,3'-thiopropionate, dibenzyl-3,3'-thiodipropionate, dicyclohexyl-3,3'-thiodipropionate, dioleyl-3,3'-thiodipropionate, didecyl-3,3'-thiodipropionate, diethyl-3,3'-thiodipropionate, lauryl ester of 3-mercaptopropionic acid, lauryl ester of 3-lauryl mercaptopropionic acid, and the phenyl ester of 3-octyl mercaptopropionic acid.

In addition to the at least one estolide compound, the plasticized compositions described herein may further comprise one or more plasticizers selected from petroleum-derived phthalates and benzoate compounds, such as dioctyl phthalate (DOP) and diallyl phthalate (DAP). Other exemplary plasticizers include, but are not limited to, one or more of the exemplary epoxy compound previously described herein.

In certain embodiments, the plasticized composition further comprises at least one additive comprising one or more compounds selected from diluents, pigments, colorants, UV absorbers, fillers, and flame retarding agents. Exemplary diluents include, but are not limited to, hydrocarbons and ketones that are liquids at 25° C. Exemplary hydrocarbons include aromatic, aliphatic, and/or cycloaliphatic hydrocarbons.

In certain embodiments, the plasticized composition may be useful as a film, coating, ink, or paint composition. In certain embodiments, the plasticized composition comprises a coating that may be applied onto metallic or non-metallic surfaces by dipping, spraying, or the use of coating rollers. In certain embodiments, the plasticized composition comprises a coating to be applied to fabrics, such as those used in the construction of resilient floor and wall coverings.

In certain embodiments, the plasticized composition comprises a solid, semi-solid, and/or molded material. In certain embodiments, the plasticized composition comprises an article of manufacture. In certain embodiments, the article one or more items selected from cookware, storage ware, furniture, appliances, automotive components, boat components, toys, sportswear, medical devices, medical implants, containers, tubes, pipes, sporting equipment, electronics, wire jacketing, cable jacketing, crates, containers, packaging, labware, floor mats, instrumentation, liquid storage containers, bags, pouches, bottles, adhesives, shoe soles, gaskets, elastic fibers, and sealants. In certain embodiments the article is manufactured by any method known to those of skill in the art. In certain embodiments, the method of manufacture is selected from injection molding, compression molding, transfer molding, casting, extruding, thermoforming, blow molding, and rotational molding.

It should be understood that in certain embodiments, one or more of the compositions described herein may be suitable for uses other than those previously set forth herein, such as crankcase oils, gearbox oils, drilling fluids, two-cycle engine oils, greases, heat-treating and cooling compositions, all-purpose and household lubricants, and lubricants for machine tools. In certain embodiments, the nontoxic nature of the estolides described herein may also make them suitable for use as lubricants in the cosmetic and personal care industry.

In certain embodiments, the estolide compounds may meet or exceed one or more of the specifications for certain end-use applications, without the need for conventional additives. For example, in certain instances, high-viscosity lubricants, such as those exhibiting a kinematic viscosity of greater than about 120 cSt at 40° C., or even greater than about 200 cSt at 40° C., may be desired for particular applications such as gearbox or wind turbine lubricants. Prior-known lubricants with such properties typically also demonstrate an increase in pour point as viscosity increases, such that prior lubricants may not be suitable for such applications in colder environments. However, in certain embodiments, the counterintuitive properties of certain compounds described herein (e.g., increased EN provides estolides with higher viscosities while retaining, or even decreasing, the oil's pour point) may make higher-viscosity estolides particularly suitable for such specialized applications.

Similarly, the use of prior-known lubricants in colder environments may generally result in an unwanted increase in a lubricant's viscosity. Thus, depending on the application, it may be desirable to use lower-viscosity oils at lower temperatures. In certain circumstances, low-viscosity oils may include those exhibiting a viscosity of lower than about 50 cSt at 40° C., or even about 40 cSt at 40° C. Accordingly, in certain embodiments, the low-viscosity estolides described herein may provide end users with a suitable alternative to high-viscosity lubricants for operation at lower temperatures.

In some embodiments, it may be desirable to prepare compositions comprising at least one estolide compound and a non-estolide base oil. For example, in certain embodiments, the estolides described herein may be co-blended with one or more components selected from polyalphaolefins, synthetic esters, polyalkylene glycols, and mineral oils (Groups I, II, and III). In addition, or in the alternative, in certain embodiments, the estolides described herein may be co-blended with one or more synthetic or petroleum-based oils to achieve desired viscosity and/or pour point profiles. In certain embodiments, certain estolides described herein also mix well with gasoline, so that they may be useful as fuel components or additives.

In certain embodiments, the lubricant compositions described herein comprise a co-blend of at least one estolide base oil or at least one estolide compound along with at least one further component, wherein the at least one further component is selected from polyalphaolefins, synthetic esters, polyalkylene glycols, mineral oils (Groups I, II, and III), vegetable and animal-based oils (e.g., mono, di-, and tri-glycerides), and fatty-acid esters. Exemplary mineral oils include, but are not limited to, those available from Petro-Canada under the trade designation Luminol TR, those available from Calumet Lubricating Co. under the trade designation Caltran 60-15, and those available from Ergon Refining Inc. under the trade designation Hivolt II. Exemplary polyalphaolefins include, but are not limited to, those having a viscosity from about 2 cSt to about 14 cSt at 100° C., which are available from Chevron under the trade designation Synfluid PAO, Amoco under the trade designation Durasyn, and Ethyl Corp. under the trade designation Ethylflo. In certain embodiments, the polyalphaolefin has a viscosity from about 4 cSt to about 8 cSt at 100° C., and may originate from oligomers such as dimers, trimers, and tetramers. In certain embodiments, the oligomers may comprise chains of 2 to 40 carbons, or chains of 2 to 20 carbons. In certain embodiments, the polyalphaolefins may comprise chains of 6 to 12 carbons, such as chains of 10 carbons. In certain embodiments, the polyalphaolefin has viscosity from about 6 cSt to about 8 cSt at 100° C.

The present disclosure further relates to methods of making estolides according to Formula I, II, and III. By way of example, the reaction of an unsaturated fatty acid with an organic acid and the esterification of the resulting free acid estolide are illustrated and discussed in the following Schemes 1 and 2. The particular structural formulas used to illustrate the reactions correspond to those for synthesis of compounds according to Formula I and III; however, the methods apply equally to the synthesis of compounds according to Formula II, with use of compounds having structure corresponding to $R_3$ and $R_4$ with a reactive site of unsaturation.

As illustrated below, compound 100 represents an unsaturated fatty acid that may serve as the basis for preparing the estolide compounds described herein.

Scheme 1

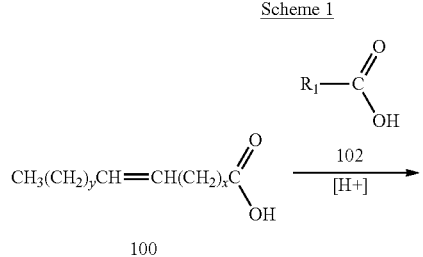

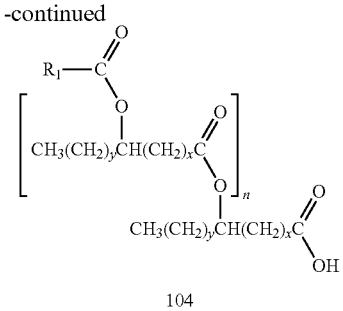

104

In Scheme 1, wherein x is, independently for each occurrence, an integer selected from 0 to 20, y is, independently for each occurrence, an integer selected from 0 to 20, n is an integer greater than or equal to 1, and $R_1$ is an optionally substituted alkyl that is saturated or unsaturated, and branched or unbranched, unsaturated fatty acid 100 may be combined with compound 102 and a proton from a proton source to form free acid estolide 104. In certain embodiments, compound 102 is not included, and unsaturated fatty acid 100 may be exposed alone to acidic conditions to form free acid estolide 104, wherein $R_1$ would represent an unsaturated alkyl group. In certain embodiments, if compound 102 is included in the reaction, $R_1$ may represent one or more optionally substituted alkyl residues that are saturated or unsaturated and branched or unbranched. Any suitable proton source may be implemented to catalyze the formation of free acid estolide 104, including but not limited to homogenous acids and/or strong acids like hydrochloric acid, sulfuric acid, perchloric acid, nitric acid, triflic acid, and the like.

Scheme 2

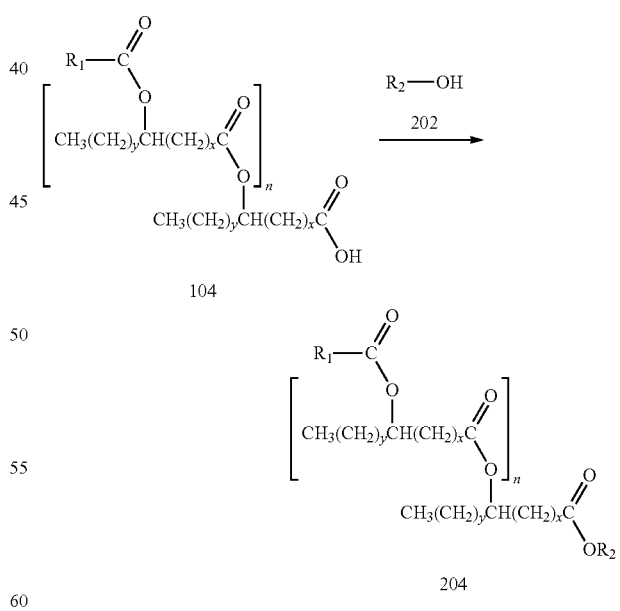

Similarly, in Scheme 2, wherein x is, independently for each occurrence, an integer selected from 0 to 20, y is, independently for each occurrence, an integer selected from 0 to 20, n is an integer greater than or equal to 1, and $R_1$ and $R_2$ are each an optionally substituted alkyl that is saturated or unsaturated, and branched or unbranched, free acid estolide 104 may be esterified by any suitable procedure known to those of skilled in the art, such as acid-catalyzed reduction with alcohol 202, to yield esterified estolide 204. Other exemplary methods may include other types of Fischer esterification, such as those using Lewis acid catalysts such as $BF_3$.

In all of the foregoing examples, the compounds described may be useful alone, as mixtures, or in combination with other compounds, compositions, and/or materials.

Methods for obtaining the novel compounds described herein will be apparent to those of ordinary skill in the art, suitable procedures being described, for example, in the examples below, and in the references cited herein.

EXAMPLES

Analytics

Nuclear Magnetic Resonance:

NMR spectra were collected using a Bruker Avance 500 spectrometer with an absolute frequency of 500.113 MHz at 300 K using $CDCl_3$ as the solvent. Chemical shifts were reported as parts per million from tetramethylsilane. The formation of a secondary ester link between fatty acids, indicating the formation of estolide, was verified with $^1H$ NMR by a peak at about 4.84 ppm.

Estolide Number (EN):

The EN was measured by GC analysis. It should be understood that the EN of a composition specifically refers to EN characteristics of any estolide compounds present in the composition. Accordingly, an estolide composition having a particular EN may also comprise other components, such as natural or synthetic additives, other non-estolide base oils, fatty acid esters, e.g., triglycerides, and/or fatty acids, but the EN as used herein, unless otherwise indicated, refers to the value for the estolide fraction of the estolide composition.

Iodine Value (IV):

The iodine value is a measure of the degree of total unsaturation of an oil. IV is expressed in terms of centigrams of iodine absorbed per gram of oil sample. Therefore, the higher the iodine value of an oil the higher the level of unsaturation is of that oil. The IV may be measured and/or estimated by GC analysis. Where a composition includes unsaturated compounds other than estolides as set forth in Formula I, II, and III, the estolides can be separated from other unsaturated compounds present in the composition prior to measuring the iodine value of the constituent estolides. For example, if a composition includes unsaturated fatty acids or triglycerides comprising unsaturated fatty acids, these can be separated from the estolides present in the composition prior to measuring the iodine value for the one or more estolides.

Acid Value:

The acid value is a measure of the total acid present in an oil. Acid value may be determined by any suitable titration method known to those of ordinary skill in the art. For example, acid values may be determined by the amount of KOH that is required to neutralize a given sample of oil, and thus may be expressed in terms of mg KOH/g of oil.

Gas Chromatography (GC):

GC analysis was performed to evaluate the estolide number (EN) and iodine value (IV) of the estolides. This analysis was performed using an Agilent 6890N series gas chromatograph equipped with a flame-ionization detector and an autosampler/injector along with an SP-2380 30 m×0.25 mm i.d. column.

The parameters of the analysis were as follows: column flow at 1.0 mL/min with a helium head pressure of 14.99 psi; split ratio of 50:1; programmed ramp of 120-135° C. at 20° C./min, 135-265° C. at 7° C./min, hold for 5 min at 265° C.; injector and detector temperatures set at 250° C.

Measuring EN and IV by GC:

To perform these analyses, the fatty acid components of an estolide sample were reacted with MeOH to form fatty acid methyl esters by a method that left behind a hydroxy group at sites where estolide links were once present. Standards of fatty acid methyl esters were first analyzed to establish elution times.

Sample Preparation:

To prepare the samples, 10 mg of estolide was combined with 0.5 mL of 0.5M KOH/MeOH in a vial and heated at 100° C. for 1 hour. This was followed by the addition of 1.5 mL of 1.0 M $H_2SO_4$/MeOH and heated at 100° C. for 15 minutes and then allowed to cool to room temperature. One (1) mL of $H_2O$ and 1 mL of hexane were then added to the vial and the resulting liquid phases were mixed thoroughly. The layers were then allowed to phase separate for 1 minute. The bottom $H_2O$ layer was removed and discarded. A small amount of drying agent ($Na_2SO_4$ anhydrous) was then added to the organic layer after which the organic layer was then transferred to a 2 mL crimp cap vial and analyzed.

EN Calculation:

The EN is measured as the percent hydroxy fatty acids divided by the percent non-hydroxy fatty acids. As an example, a dimer estolide would result in half of the fatty acids containing a hydroxy functional group, with the other half lacking a hydroxyl functional group. Therefore, the EN would be 50% hydroxy fatty acids divided by 50% non-hydroxy fatty acids, resulting in an EN value of 1 that corresponds to the single estolide link between the capping fatty acid and base fatty acid of the dimer.

IV Calculation:

The iodine value is estimated by the following equation based on ASTM Method D97 (ASTM International, Conshohocken, Pa.):

$$IV = \Sigma 100 \times \frac{A_f \times MW_I \times db}{MW_f}$$

$A_f$=fraction of fatty compound in the sample
$MW_I$=253.81, atomic weight of two iodine atoms added to a double bond
db=number of double bonds on the fatty compound
$MW_f$=molecular weight of the fatty compound The properties of exemplary estolide compounds and compositions described herein are identified in the following examples and tables.

Other Measurements:

Except as otherwise described, color is measured by ASTM Method D1500, neutralization number (TAN) is measured by ASTM Method D974, pour point is measured by ASTM Method D97-96a, cloud point is measured by ASTM Method D2500, viscosity/kinematic viscosity is measured by ASTM Method D445-97, viscosity index is measured by ASTM Method D2270-93 (Reapproved 1998), specific gravity is measured by ASTM Method D4052, fire point and flash point are measured by ASTM Method D92, evaporative loss is measured by ASTM Method D5800, vapor pressure is measured by ASTM Method D5191, and acute aqueous toxicity is measured by Organization of Economic Cooperation and Development (OECD) 203.

Example 1

The acid catalyst reaction was conducted in a 50 gallon Pfaudler RT-Series glass-lined reactor. Oleic acid (65 Kg, OL 700, Twin Rivers) was added to the reactor with 70% perchloric acid (992.3 mL, Aldrich Cat#244252) and heated to 60° C. in vacuo (10 torr abs (Torr absolute; 1 torr=~1 mmHg)) for 24 hrs while continuously being agitated. After 24 hours the vacuum was released. 2-Ethylhexanol (29.97 Kg) was then added to the reactor and the vacuum was restored. The reaction was allowed to continue under the same conditions (60° C., 10 torr abs) for 4 more hours. At which time, KOH (645.58 g) was dissolved in 90% ethanol/water (5000 mL, 90% EtOH by volume) and added to the reactor to quench the acid. The solution was then allowed to cool for approximately 30 minutes. The contents of the reactor were then pumped through a 1 micron (µ) filter into an accumulator to filter out the salts. Water was then added to the accumulator to wash the oil. The two liquid phases were thoroughly mixed together for approximately 1 hour. The solution was then allowed to phase separate for approximately 30 minutes. The water layer was drained and disposed of. The organic layer was again pumped through a 1µ filter back into the reactor. The reactor was heated to 60° C. in vacuo (10 torr abs) until all ethanol and water ceased to distill from solution. The reactor was then heated to 100° C. in vacuo (10 torr abs) and that temperature was maintained until the 2-ethylhexanol ceased to distill from solution. The remaining material was then distilled using a Myers 15 Centrifugal Distillation still at 200° C. under an absolute pressure of approximately 12 microns (0.012 torr) to remove all monoester material leaving behind estolides (Ex. 1). Certain data are reported below in Tables 1 and 8.

Example 2

The acid catalyst reaction was conducted in a 50 gallon Pfaudler RT-Series glass-lined reactor. Oleic acid (50 Kg, OL 700, Twin Rivers) and whole cut coconut fatty acid (18.754 Kg, TRC 110, Twin Rivers) were added to the reactor with 70% perchloric acid (1145 mL, Aldrich Cat#244252) and heated to 60° C. in vacuo (10 torr abs) for 24 hrs while continuously being agitated. After 24 hours the vacuum was released. 2-Ethylhexanol (34.58 Kg) was then added to the reactor and the vacuum was restored. The reaction was allowed to continue under the same conditions (60° C., 10 torr abs) for 4 more hours. At which time, KOH (744.9 g) was dissolved in 90% ethanol/water (5000 mL, 90% EtOH by volume) and added to the reactor to quench the acid. The solution was then allowed to cool for approximately 30 minutes. The contents of the reactor were then pumped through a 1µ filter into an accumulator to filter out the salts. Water was then added to the accumulator to wash the oil. The two liquid phases were thoroughly mixed together for approximately 1 hour. The solution was then allowed to phase separate for approximately 30 minutes. The water layer was drained and disposed of. The organic layer was again pumped through a 1µ filter back into the reactor. The reactor was heated to 60° C. in vacuo (10 torr abs) until all ethanol and water ceased to distill from solution. The reactor was then heated to 100° C. in vacuo (10 torr abs) and that temperature was maintained until the 2-ethylhexanol ceased to distill from solution. The remaining material was then distilled using a Myers 15 Centrifugal Distillation still at 200° C. under an absolute pressure of approximately 12 microns (0.012 torr) to remove all monoester material leaving behind estolides (Ex. 2). Certain data are reported below in Tables 2 and 7.

Example 3

The estolides produced in Example 1 (Ex. 1) were subjected to distillation conditions in a Myers 15 Centrifugal Distillation still at 300° C. under an absolute pressure of approximately 12 microns (0.012 torr). This resulted in a primary distillate having a lower EN average (Ex. 3A), and a distillation residue having a higher EN average (Ex. 3B). Certain data are reported below in Tables 1 and 8.

TABLE 1

| Estolide Base Stock | EN | Pour Point (° C.) | Iodine Value (cg/g) |
|---|---|---|---|
| Ex. 3A | 1.35 | −32 | 31.5 |
| Ex. 1 | 2.34 | −40 | 22.4 |
| Ex. 3B | 4.43 | −40 | 13.8 |

Example 4

Estolides produced in Example 2 (Ex. 2) were subjected to distillation conditions in a Myers 15 Centrifugal Distillation still at 300° C. under an absolute pressure of approximately 12 microns (0.012 torr). This resulted in a primary distillate having a lower EN average (Ex. 4A), and a distillation residue having a higher EN average (Ex. 4B). Certain data are reported below in Tables 2 and 7.

TABLE 2

| Estolide Base Stock | EN | Pour Point (° C.) | Iodine Value (cg/g) |
|---|---|---|---|
| Ex. 4A | 1.31 | −30 | 13.8 |
| Ex. 2 | 1.82 | −33 | 13.2 |
| Ex. 4B | 3.22 | −36 | 9.0 |

Example 5

Estolides produced by the method set forth in Example 1 were subjected to distillation conditions (ASTM D-6352) at 1 atm (atmosphere) over the temperature range of about 0° C. to about 710° C., resulting in 10 different estolide cuts recovered at increasing temperatures The amount of material distilled from the sample in each cut and the temperature at which each cut distilled (and recovered) are reported below in Table 3:

TABLE 3

| Cut (% of total) | Temp. (° C.) |
|---|---|
| 1 (1%) | 416.4 |
| 2 (1%) | 418.1 |
| 3 (3%) | 420.7 |
| 4 (20%) | 536.4 |
| 5 (25%) | 553.6 |
| 6 (25%) | 618.6 |
| 7 (20%) | 665.7 |
| 8 (3%) | 687.6 |

TABLE 3-continued

| Cut (% of total) | Temp. (° C.) |
| --- | --- |
| 9 (1%) | 700.6 |
| 10 (1%) | 709.1 |

Example 6

Estolides made according to the method of Example 2 were subjected to distillation conditions (ASTM D-6352) at 1 atm over the temperature range of about 0° C. to about 730° C., which resulted in 10 different estolide cuts. The amount of each cut and the temperature at which each cut was recovered are reported in Table 4.

TABLE 4

| Cut (% of total) | Temp. (° C.) |
| --- | --- |
| 1 (1%) | 417.7 |
| 2 (1%) | 420.2 |
| 3 (3%) | 472.0 |
| 4 (5%) | 509.7 |
| 5 (15%) | 533.7 |
| 6 (25%) | 583.4 |
| 7 (25%) | 636.4 |
| 8 (5%) | 655.4 |
| 9 (5%) | 727.0 |
| 10 (15%) | >727.0 |

Example 7

Estolide base oil 4B (from Example 4) was subjected to distillation conditions (ASTM D-6352) at 1 atm over the temperature range of about 0° C. to about 730° C., which resulted in 9 different estolide cuts. The amount of each cut and the temperature at which each cut was recovered are reported in Table 5a.

TABLE 5a

| Cut (% of total) | Temp. (° C.) |
| --- | --- |
| 1 (1%) | 432.3 |
| 2 (1%) | 444.0 |
| 3 (3%) | 469.6 |
| 4 (5%) | 521.4 |
| 5 (15%) | 585.4 |
| 6 (25%) | 617.1 |
| 7 (25%) | 675.1 |
| 8 (5%) | 729.9 |
| 9 (20%) | >729.9 |

Example 8

Estolides were made according to the method set forth in Example 1, except that the 2-ethylhexanol esterifying alcohol used in Example 1 was replaced with various other alcohols. Alcohols used for esterification include those identified in Table 5b below. The properties of the resulting estolides are set forth in Table 9.

TABLE 5b

| Alcohol | Structure |
| --- | --- |
| Jarcol ™ I-18CG | iso-octadecanol |
| Jarcol ™ I-12 | 2-butyloctanol |
| Jarcol ™ I-20 | 2-octyldodecanol |
| Jarcol ™ I-16 | 2-hexyldecanol |
| Jarcol ™ 85BJ | cis-9-octadecen-1-ol |
| Fineoxocol ® 180 | $CH_3-\underset{\underset{CH_3}{|}}{\overset{\overset{CH_3}{|}}{C}}-CH_2-\underset{\underset{CH_3}{|}}{\overset{\overset{CH_3}{|}}{CH}}-(CH_2)_2$ ... |
| Jarcol ™ I-18T | 2-octyldecanol |

Example 9

Estolides were made according to the method set forth in Example 2, except the 2-ethylhexanol esterifying alcohol was replaced with isobutanol. The properties of the resulting estolides are set forth in Table 9.

Example 10

Estolides of Formula I, II, and III are prepared according to the method set forth in Examples 1 and 2, except that the 2-ethylhexanol esterifying alcohol is replaced with various other alcohols. Alcohols to be used for esterification include those identified in Table 6 below. Esterifying alcohols to be used, including those listed below, may be saturated or unsaturated, and branched or unbranched, or substituted with one or more alkyl groups selected from methyl, ethyl, propyl, isopropyl, butyl, isobutyl, sec-butyl, tert-butyl, pentyl, isopentyl, neopentyl, hexyl, isohexyl, and the like, to form a branched or unbranched residue at the $R_2$ position. Examples of combinations of esterifying alcohols and $R_2$ Substituents are set forth below in Table 6:

TABLE 6

| Alcohol | $R_2$ Substituents |
| --- | --- |
| $C_1$ alkanol | methyl |
| $C_2$ alkanol | ethyl |
| $C_3$ alkanol | n-propyl, isopropyl |
| $C_4$ alkanol | n-butyl, isobutyl, sec-butyl |
| $C_5$ alkanol | n-pentyl, isopentyl neopentyl |
| $C_6$ alkanol | n-hexyl, 2-methyl pentyl, 3-methyl pentyl, 2,2-dimethyl butyl, 2,3-dimethyl butyl |
| $C_7$ alkanol | n-heptyl and other structural isomers |
| $C_8$ alkanol | n-octyl and other structural isomers |
| $C_9$ alkanol | n-nonyl and other structural isomers |
| $C_{10}$ alkanol | n-decanyl and other structural isomers |
| $C_{11}$ alkanol | n-undecanyl and other structural isomers |
| $C_{12}$ alkanol | n-dodecanyl and other structural isomers |
| $C_{13}$ alkanol | n-tridecanyl and other structural isomers |
| $C_{14}$ alkanol | n-tetradecanyl and other structural isomers |
| $C_{15}$ alkanol | n-pentadecanyl and other structural isomers |
| $C_{16}$ alkanol | n-hexadecanyl and other structural isomers |
| $C_{17}$ alkanol | n-heptadecanyl and other structural isomers |
| $C_{18}$ alkanol | n-octadecanyl and other structural isomers |
| $C_{19}$ alkanol | n-nonadecanyl and other structural isomers |
| $C_{20}$ alkanol | n-icosanyl and other structural isomers |
| $C_{21}$ alkanol | n-heneicosanyl and other structural isomers |
| $C_{22}$ alkanol | n-docosanyl and other structural isomers |

TABLE 7

| PROPERTY | ADD-ITIVES | ASTM METHOD | Ex. 4A | Ex. 2 | Ex. 4B |
|---|---|---|---|---|---|
| Color | None | — | Light Gold | Amber | Amber |
| Specific Gravity (15.5° C.), g/ml | None | D 4052 | 0.897 | 0.904 | 0.912 |
| Viscosity-Kinematic at 40° C., cSt | None | D 445 | 32.5 | 65.4 | 137.3 |
| Viscosity-Kinematic at 100° C., cSt | None | D 445 | 6.8 | 11.3 | 19.9 |
| Viscosity Index | None | D 2270 | 175 | 167 | 167 |
| Pour Point, ° C. | None | D 97 | −30 | −33 | −36 |
| Cloud Point, ° C. | None | D 2500 | −30 | −32 | −36 |
| Flash Point, ° C. | None | D 92 | 278 | 264 | 284 |
| Fire Point, ° C. | None | D 92 | 300 | 300 | 320 |
| Evaporative Loss (NOACK), wt. % | None | D 5800 | 1.9 | 1.4 | 0.32 |
| Vapor Pressure-Reid (RVP), psi | None | D 5191 | ≈0 | ≈0 | ≈0 |

TABLE 8

| PROPERTY | ADD-ITIVES | ASTM METHOD | Ex. 3A | Ex. 1 | Ex. 3B |
|---|---|---|---|---|---|
| Color | None | — | Light Gold | Amber | Amber |
| Specific Gravity (15.5° C.), g/ml | None | D 4052 | 0.897 | 0.906 | 0.917 |
| Viscosity-Kinematic at 40° C., cSt | None | D 445 | 40.9 | 91.2 | 211.6 |
| Viscosity-Kinematic at 100° C., cSt | None | D 445 | 8.0 | 14.8 | 27.8 |
| Viscosity Index | None | D 2270 | 172 | 170 | 169 |
| Pour Point, ° C. | None | D 97 | −32 | −40 | −40 |
| Cloud Point, ° C. | None | D 2500 | −32 | −33 | −40 |
| Flash Point, ° C. | None | D 92 | 278 | 286 | 306 |
| Fire Point, ° C. | None | D 92 | 300 | 302 | 316 |
| Evaporative Loss (NOACK), wt. % | None | D 5800 | 1.4 | 0.8 | 0.3 |
| Vapor Pressure-Reid (RVP), psi | None | D 5191 | ≈0 | ≈0 | ≈0 |

TABLE 9

| Example # | Alcohol | Estimated EN (approx.) | Pour Pt. ° C. | Cloud Pt. ° C. | Visc. @ 40° C. | Visc. @ 100° C. | Visc. Index |
|---|---|---|---|---|---|---|---|
| 8 | Jarcol™ I-18CG | 2.0-2.6 | −15 | −13 | 103.4 | 16.6 | 174 |
| 8 | Jarcol™ I-12 | 2.0-2.6 | −39 | −40 | 110.9 | 16.9 | 166 |
| 8 | Jarcol™ I-20 | 2.0-2.6 | −42 | <−42 | 125.2 | 18.5 | 166 |
| 8 | Jarcol™ I-16 | 2.0-2.6 | −51 | <−51 | 79.7 | 13.2 | 168 |
| 8 | Jarcol™ 85BJ | 2.0-2.6 | −15 | −6 | 123.8 | 19.5 | 179 |
| 8 | Fineoxocol® 180 | 2.0-2.6 | −39 | −41 | 174.2 | 21.1 | 143 |
| 8 | Jarcol™ I-18T | 2.0-2.6 | −42 | <−42 | 130.8 | 19.2 | 167 |
| 8 | Isobutanol | 2.0-2.6 | −36 | −36 | 74.1 | 12.6 | 170 |
| 9 | Isobutanol | 1.5-2.2 | −36 | −36 | 59.5 | 10.6 | 170 |

Example 11

Saturated and unsaturated estolides having varying acid values were subjected to several corrosion and deposit tests. These tests included the High Temperature Corrosion Bench Test (HTCBT) for several metals, the ASTM D130 corrosion test, and the MHT-4 TEOST (ASTM D7097) test for correlating piston deposits. The estolides tested having higher acid values (0.67 mg KOH/g) were produced using the method set forth in Examples 1 and 4 for producing Ex. 1 and Ex. 4A (Ex. 1* and Ex. 4A* below). The estolides tested having lower acid values (0.08 mg KOH/g) were produced using the method set forth in Examples 1 and 4 for producing Ex. 1 and Ex. 4A except the crude free-acid estolide was worked up and purified prior to esterification with $BF_3.OET_2$ (0.15 equiv.; reacted with estolide and 2-EH in Dean Stark trap at 80° C. in vacuo (10 torr abs) for 12 hrs while continuously being agitated; crude reaction product washed 4×$H_2O$; excess 2-EH removed by heating washed reaction product to 140° C. in vacuo (10 torr abs) for 1 hr) (Ex. 4A# below). Estolides having an IV of 0 were hydrogenated via 10 wt. % palladium embedded on carbon at 75° C. for 3 hours under a pressurized hydrogen atmosphere (200 psig) (Ex. 4A*H and Ex. 4A#H below) The corrosion and deposit tests were performed with a Dexos™ additive package. Results were compared against a mineral oil standard:

TABLE 10

|  | Standard | Ex. 1* Estolide | Ex. 4A* Estolide | Ex. 4A*H Estolide | Ex. 4A# Estolide | Ex. 4A#H Estolide |
|---|---|---|---|---|---|---|
| Acid Value (mg KOH/g) | — | ~0.7 | 0.67 | 0.67 | 0.08 | 0.08 |
| Iodine Value (IV) | — | ~45 | 16 | 0 | 16 | 0 |
| HTCBT Cu | 13 | 739 | 279 | 60 | 9.3 | 13.6 |
| HTCBT Pd | 177 | 11,639 | 1,115 | 804 | 493 | 243 |
| HTCBT Sn | 0 | 0 | 0 | 0 | 0 | 0 |
| ASTM D130 | 1A | 4B | 3A | 1B | 1A | 1A |
| MHT-4 | 18 | 61 | 70 | 48 | 12 | 9.3 |

Example 12

"Ready" and "ultimate" biodegradability of the estolide produced in Ex. 1 was tested according to standard OECD procedures. Results of the OECD biodegradability studies are set forth below in Table 11:

TABLE 11

|  | 301D 28-Day (% degraded) | 302D Assay (% degraded) |
|---|---|---|
| Canola Oil | 86.9 | 78.9 |
| Ex. 1 | 64.0 | 70.9 |
| Base Stock |  |  |

Example 13

The Ex. 1 estolide base stock from Example 1 was tested under OECD 203 for Acute Aquatic Toxicity. The tests showed that the estolides are nontoxic, as no deaths were reported for concentration ranges of 5,000 mg/L and 50,000 mg/L.

Example 14

The miscibility of the Ex. 4A estolide base stock in certain refrigerants was tested at different weight percentages of the overall estolide/refrigerant composition, as well as the low temperature down to which miscibility was achieved. The results of the miscible (M)-immiscible (I) study are set forth below in Table 12:

TABLE 12

| Refrigerant | Wt. % of Ex. 4A estolide | | | | | Low Temp. (° C.) |
|---|---|---|---|---|---|---|
| | 2% | 5% | 10% | 20% | 30% | |
| HFC-134a | I | I | I | I | I | — |
| R-22 | NT* | M | M | M | M | −40 |
| R-404A | I | I | I | I | I | — |
| R-407C | I | I | I | I | I | — |
| R-410A | I | I | I | I | I | — |

*NT = Not Tested

Example 15

Refrigerating fluid compositions are prepared in the manner set forth in Example 14, except the Ex. 4A estolide base stock is replaced with estolides prepared according to the method set forth in Ex. 1, Ex. 2, Ex. 3 (3A and 3B), and Ex. 4B to provide separate refrigerating fluid compositions for each estolide.

The invention claimed is:

1. A method comprising:
   transferring power in hydraulic machinery through the use of a power transfer medium,
   wherein the power transfer medium comprises an extreme pressure agent and an estolide base oil consisting essentially of at least one estolide compound, and said medium exhibits an EN selected from an integer or fraction of an integer that is equal to or less than 2, wherein EN represents the average number of estolide linkages for estolide compounds contained in the medium, and wherein the estolide base oil exhibits a kinematic viscosity of less than 45 cSt when measured at 40° C.

2. The method according to claim 1, wherein said medium exhibits an EN that is an integer or fraction of an integer selected from 1 to 2.

3. The method according to claim 1, wherein the at least one estolide compound is selected from compounds of Formula I:

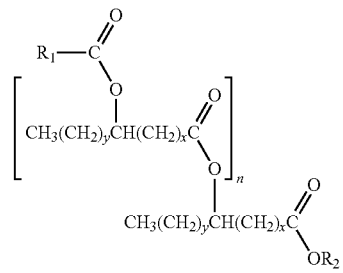

Formula I wherein
x is, independently for each occurrence, an integer selected from 0 to 20;
y is, independently for each occurrence, an integer selected from 0 to 20;
n is an integer selected from 0 to 12;
$R_1$ is an optionally substituted alkyl that is saturated or unsaturated, and branched or unbranched; and
$R_2$ is an optionally substituted alkyl that is saturated or unsaturated, and branched or unbranched;
wherein each fatty acid chain residue of said at least one compound is independently optionally substituted.

4. The method according to claim 3, wherein
x is, independently for each occurrence, an integer selected from 0 to 14;
y is, independently for each occurrence, an integer selected from 0 to 14;
n is an integer selected from 0 to 8;
$R_1$ is an optionally substituted $C_1$ to $C_{22}$ alkyl that is saturated or unsaturated, and branched or unbranched; and
$R_2$ is an optionally substituted $C_1$ to $C_{22}$ alkyl that is saturated or unsaturated, and branched or unbranched,
wherein each fatty acid chain residue is unsubstituted.

5. The method according to claim 4, wherein
x+y is, independently for each chain, an integer selected from 13 to 15; and
n is an integer selected from 0 to 6.

6. The method according to claim 5, wherein x+y is 15 for at least one chain.

7. The method according to claim 4, wherein $R_2$ is a branched or unbranched $C_1$ to $C_{20}$ alkyl that is saturated.

8. The method according to claim 7, wherein $R_2$ is selected from $C_6$ to $C_{12}$ alkyl.

9. The method according to claim 8, wherein $R_2$ is 2-ethylhexyl.

10. The method according to claim 4, wherein $R_1$ is an unbranched $C_1$ to $C_{20}$ alkyl that is saturated or unsaturated.

11. The method according to claim 10, wherein $R_1$ is saturated.

12. The method according to claim 10, wherein $R_1$ is selected from unsubstituted $C_7$ to $C_{17}$ alkyl.

13. The method according to claim 4, wherein x is selected from 7 and 8.

14. The method according to claim 13, wherein y is selected from 7 and 8.

15. The method according to claim 13, wherein y is 0.

16. The method according to claim 3, wherein said medium exhibits an EN that is an integer or fraction of an integer selected from 1 to 2, wherein EN represents the average number of estolide linkages for estolide compounds contained in the medium.

17. The method according to claim 3, wherein the extreme pressure agent selected from at least one of a phosphorous extreme pressure agent or a sulfur extreme pressure agent.

18. The method according to claim 3, wherein the extreme pressure agent is selected from at least one of a phosphoric acid ester, an acidic phosphoric acid ester, an amine phosphate, an amine salts of phosphoric acid, an amine salt of an acidic phosphoric acid ester, a chlorinated acidic phosphoric acid ester, or a phosphorous acid ester.

19. The method according to claim 3, wherein the extreme pressure agent is selected from at least one of a sulfurized oil, a sulfurized fat, a sulfurized fatty acid, a sulfurized ester, a sulfurized olefin, a dihydrocarbyl(poly)sulfide, a thiadiazole compound, an alkylthiocarbamoyl compound, a thiocarbamate compound, a thioterpene compound, a diallylthiodipropionate compound, a sulfurized mineral oil, a zinc dithiocarbamate compound, or a molybdenum dithiocarbamate compound.

20. The method according to claim 3, wherein the estolide base oil exhibits a kinematic viscosity of 20 cSt to 45 cSt when measured at 40° C.

\* \* \* \* \*